United States Patent
Hiramoto

(10) Patent No.: US 10,341,528 B2
(45) Date of Patent: Jul. 2, 2019

(54) SETTING AN IMAGE FORMING APPARATUS AS A DEFAULT DEVICE

(71) Applicant: Konica Minolta, Inc., Tokyo (JP)

(72) Inventor: Hirotsugu Hiramoto, Kobe (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/864,609

(22) Filed: Jan. 8, 2018

(65) Prior Publication Data
US 2018/0198948 A1    Jul. 12, 2018

(30) Foreign Application Priority Data

Jan. 11, 2017    (JP) .................................. 2017-002650

(51) Int. Cl.
- *H04N 1/333* (2006.01)
- *H04N 1/00* (2006.01)
- *H04N 1/32* (2006.01)

(52) U.S. Cl.
CPC ..... *H04N 1/33384* (2013.01); *H04N 1/00204* (2013.01); *H04N 1/00954* (2013.01); *H04N 1/32101* (2013.01); *H04N 1/32523* (2013.01); *H04N 1/32587* (2013.01); *H04N 2201/0094* (2013.01); *H04N 2201/3205* (2013.01)

(58) Field of Classification Search
CPC ........... H04N 1/33384; H04N 1/32523; H04N 1/00954; H04N 1/333
See application file for complete search history.

(56) References Cited

U.S. PATENT DOCUMENTS

2014/0139877 A1* 5/2014 Ohara .................. G06F 3/1293
358/1.15

FOREIGN PATENT DOCUMENTS

JP    2006-178846 A    7/2006

OTHER PUBLICATIONS

TheWindowsClub, retrieved from https://web.archive.org/web/20161223104734/https://www.thewindowsclub.com/default-printer-keeps-changing-windows on Sep. 18, 2018.*

* cited by examiner

*Primary Examiner* — Eric A. Rust
(74) *Attorney, Agent, or Firm* — Osha Liang LLP

(57) ABSTRACT

A control device that executes an operating system program includes a hardware processor, wherein the operating system program defines a process of setting one image forming apparatus among a plurality of image forming apparatuses as a default device, and a changing process, in the case where an execution device different from the default device is designated from among the plurality of image forming apparatuses by an application task for executing an application program and printing is performed by the execution device, setting the execution device as the default device, and the hardware processor allows one control target device among the plurality of image forming apparatuses to perform printing in response to an instruction for printing given by the application task, and maintains the same image forming apparatus as the default device before and after printing is performed by the control target device.

17 Claims, 15 Drawing Sheets

F I G. 8

SETTING AN IMAGE FORMING APPARATUS AS A DEFAULT DEVICE

CROSS-REFERENCE TO RELATED APPLICATIONS

The entire disclosure of Japanese patent Application No. 2017-002650, filed on Jan. 11, 2017, is incorporated herein by reference in its entirety.

BACKGROUND

Technical Field

The present invention relates to a control device, a control method and a non-transitory computer-readable recording medium storing a printer driver program. In particular, the present invention relates to a control device that executes an operating system program, a control method performed in the control device and a non-transitory computer-readable recording medium storing a printer driver program.

Description of the Related Art

An information processing apparatus such as a personal computer (hereinafter referred to as a "PC") is installed with a printer driver program in order to control an image forming apparatus represented by a Multi Function Peripheral (hereinafter referred to as an "MFP"). Hereinafter, a task formed in the case where a CPU included in the information processing apparatus executes a printer driver program is simply referred to as a "printer driver". A user may selectively use a plurality of MFPs according to his or her purposes. Different MFPs are used according to a size of sheets of paper for printing, for example. Generally, different printer driver programs are respectively installed in a plurality of types of the MFPs in order for the PC to be able to use the plurality of types of MFPs.

An operating system program (hereinafter referred to as an "OS program") installed in the PC has a function of setting any one of the plurality of MFPs as a default device. In the case where the user gives an instruction for printing without designating an MFP to be used, printing is performed by the default device.

As a technique for switching devices for the default device, for example, Japanese Patent Laid-Open No. 2006-178846 discloses a printer system that includes a printer information detection means for detecting information about a type of rolled paper and a width of rolled paper set in a printer device, an optimum printer determination means for determining the most suitable printer for printing by the detection means, and a default printer switching means for setting the printer determined by the optimum printer determining means as a default printer and switching its drivers.

Further, as a function of an OS program, there is a function of automatically setting the last used MFP among the plurality of MFPs as the default device. However, according to the technique described in Japanese Patent Laid-Open No. 2006-178846 and the function of the OS program, even in the case where an MFP with low frequency of use is temporarily used, the MFP is set as the default device. Thus, in the case where an MFP used on a daily basis (high frequency of use) is thereafter used, it is necessary that the user changes the default device again. Thus, the user may have to involve in extra labor, and convenience is degraded.

SUMMARY

According to one or more embodiments of the present invention, a control device that executes an operating system program includes a hardware processor, wherein the operating system program defines a process of setting one image forming apparatus among a plurality of image forming apparatuses as a default device, and a changing process of, in the case where an execution device, which is different from the default device, among the plurality of image forming apparatuses is designated by an application task for executing an application program, and printing is performed by the execution device, setting the execution device as the default device, and the hardware processor, in response to being instructed to perform printing by the application task, allows one control target device among the plurality of image forming apparatuses to perform printing, and maintains the same image forming apparatus as the default device before and after printing is performed by the control target device.

According to one or more embodiments of the present invention, a control method performed in a control device executes an operating system program, wherein the operating system program defines a process of setting one image forming apparatus among a plurality of image forming apparatuses as a default device, and a changing process of, in the case where an execution device, which is different from the default device, among the plurality of image forming apparatuses is designated by an application task for executing an application program, and printing is performed by the execution device, setting the execution device as the default device, and the control method includes a print control step of, in response to reception of an instruction for printing given by the application task, allowing one control target device among the plurality of image forming apparatuses to perform printing, and a maintaining step of maintaining the same image forming apparatus as the default device before and after printing is performed by the control target device.

According to one or more embodiments of the present invention, a non-transitory computer-readable recording medium stores a printer driver program, wherein the printer driver program is executed in a hardware processor included in a control device that executes an operating system program, and the operating system program defines a process of setting one image forming apparatus among a plurality of image forming apparatuses as a default device, and a changing process of, in the case where an execution device, which is different from the default device, among the plurality of image forming apparatuses is designated by an application task for executing an application program, and printing is performed by the execution device, setting the execution device as the default device, the printer driver program allows the hardware processor to perform a print control step of, in response to reception of an instruction for printing given by the application task, allowing one control target device among the plurality of image forming apparatuses to perform printing, and a maintaining step of maintaining the same image forming apparatus as the default device before and after printing is performed by the control target device.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 8 is a diagram showing an example of a target setting screen according to one or more embodiments:

DETAILED DESCRIPTION OF EMBODIMENTS

Figure 1:
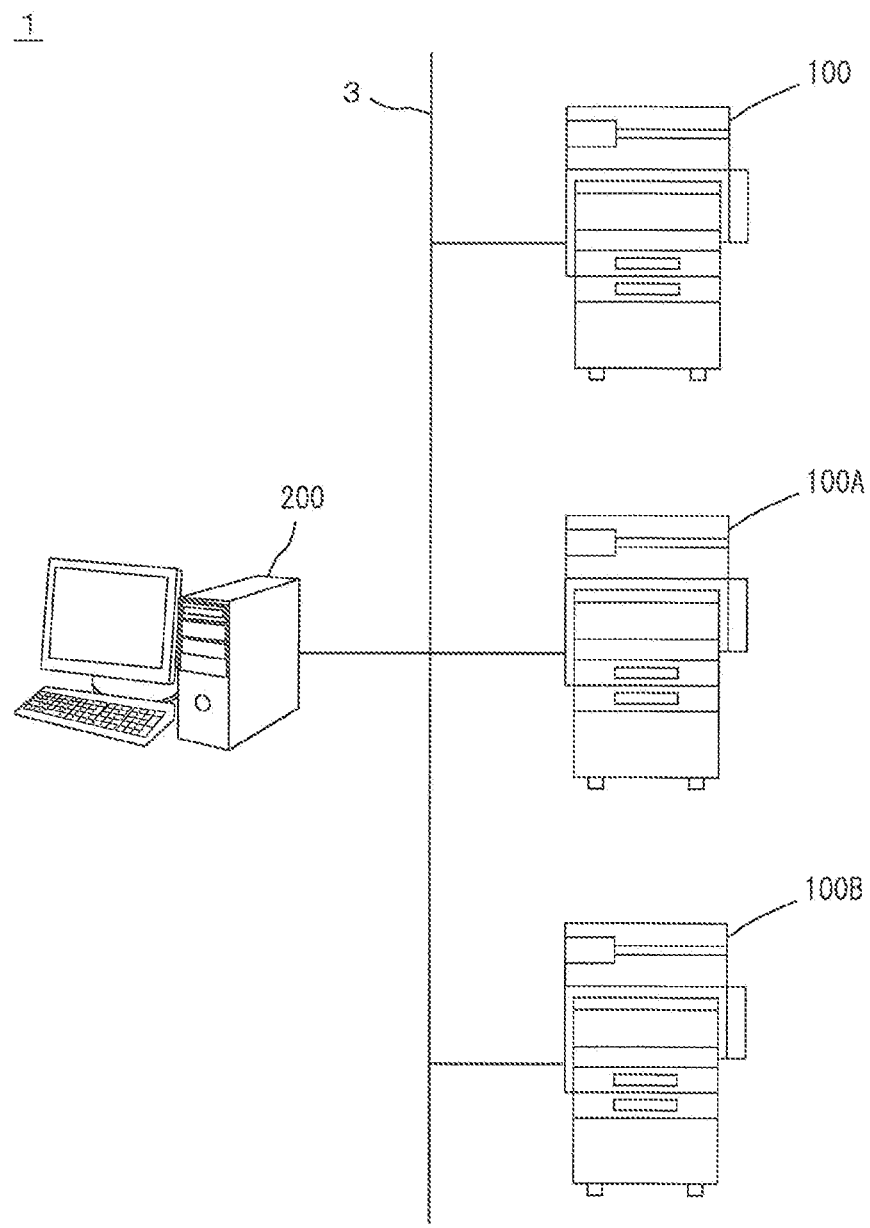
FIG. 1 is a diagram showing an example of an overview of a print system according to one or more embodiments of the present invention.

Hereinafter, embodiments of the present invention will be described with reference to the drawings. However, the scope of the invention is not limited to the disclosed embodiments.

Embodiments of the present invention will be described below with reference to the drawings. In the following description, the same parts are denoted with the same reference characters. Their names and functions are also the same. Thus, a detailed description thereof will not be repeated.

FIG. 1 is a diagram showing an example of an overview of a print system according to one or more embodiments of the present invention. Referring to FIG. 1, the print system 1 includes MFPs (Multi Function Peripherals) 100, 100A, 100B and a personal computer (PC) 200. The MFPs 100, 100A, 100B and the PC 200 are connected to a Local Area Network (LAN) 3.

The PC 200 is a general computer and installed with an operating system program (hereinafter referred to as an "OS program") and a printer driver program. In the present example, three printer driver programs that define processes of controlling the respective MFPs 100, 100A, 100B are installed. As long as being connectable to the LAN 3 similarly to the PC 200, a portable information device carried and used by a user such as a smartphone, a tablet terminal or a PDA (Personal Digital Assistant) may be used.

Figure 2:
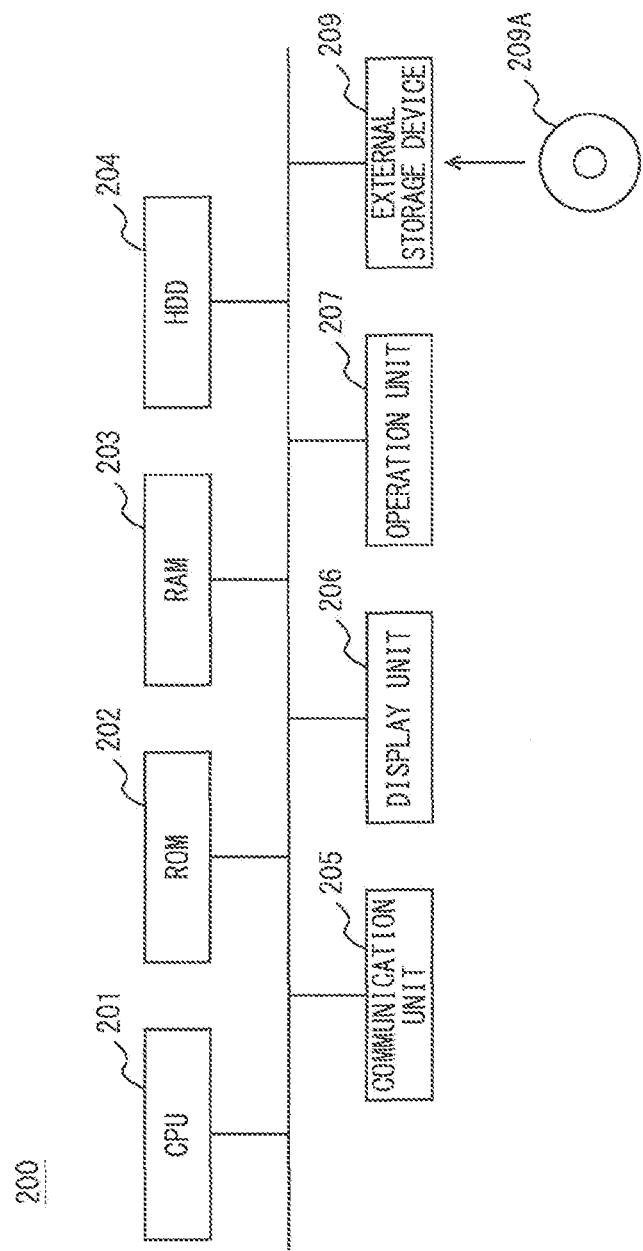
FIG. 2 is a block diagram showing an example of an outline of a hardware configuration of a PC according to one or more embodiments.

FIG. 2 is a block diagram showing an example of an outline of a hardware configuration of the PC 200 according to one or more embodiments. Referring to FIG. 2, the PC 200 includes a Central Processing Unit (CPU) 201 for controlling the entire PC 200, a ROM (Read Only Memory) 202 that stores a program executed by a CPU 201, a RAM (Random Access Memory) 203 that is used as a work area of the CPU 201, a hard disc drive (HDD) 204 that stores data in a non-volatile manner, a communication unit 205 that connects the CPU 201 to the LAN 3, a display unit 206 that displays information, an operation unit 207 that accepts an input of an operation by the user and an external storage device 209.

The CPU 201 downloads a program from a computer connected to the Internet and stores the program in the HDD 204. Alternatively, a computer connected to the network writes a program in the HDD 204, and the program stored in the HDD 204 is loaded into the RAM 203 to be executed in the CPU 201. The HDD 204 stores the OS program, an application program and the printer driver program.

The external storage device 209 is mounted with a CD-ROM (Compact Disc Read Only Memory) 209A. While an example in which the CPU 201 executes a program stored in the ROM 202 or the HDD 204 is described in the present example, the CPU 201 may control the external storage device 209, may read out a program executed by the CPU 201 from the ROM 209A and may store the read program in the RAM 203 for execution.

It is noted that the recording medium for storing the program executed by the CPU 201 is not limited to the CD-ROM 209A. It may be a flexible disc, a cassette tape, an optical disc (MO (Magnetic Optical Disc)/MD (Mini Disc)/DVD (Digital Versatile Disc)), an IC card, an optical card, a semiconductor memory such as a mask ROM, an EPROM (Erasable Programmable ROM) and an EEPROM (Electrically EPROM) or the like. The program referred to here includes not only a program directly executable by the CPU 201 but also a source program, a compressed program, an encrypted program or the like.

Figure 3:
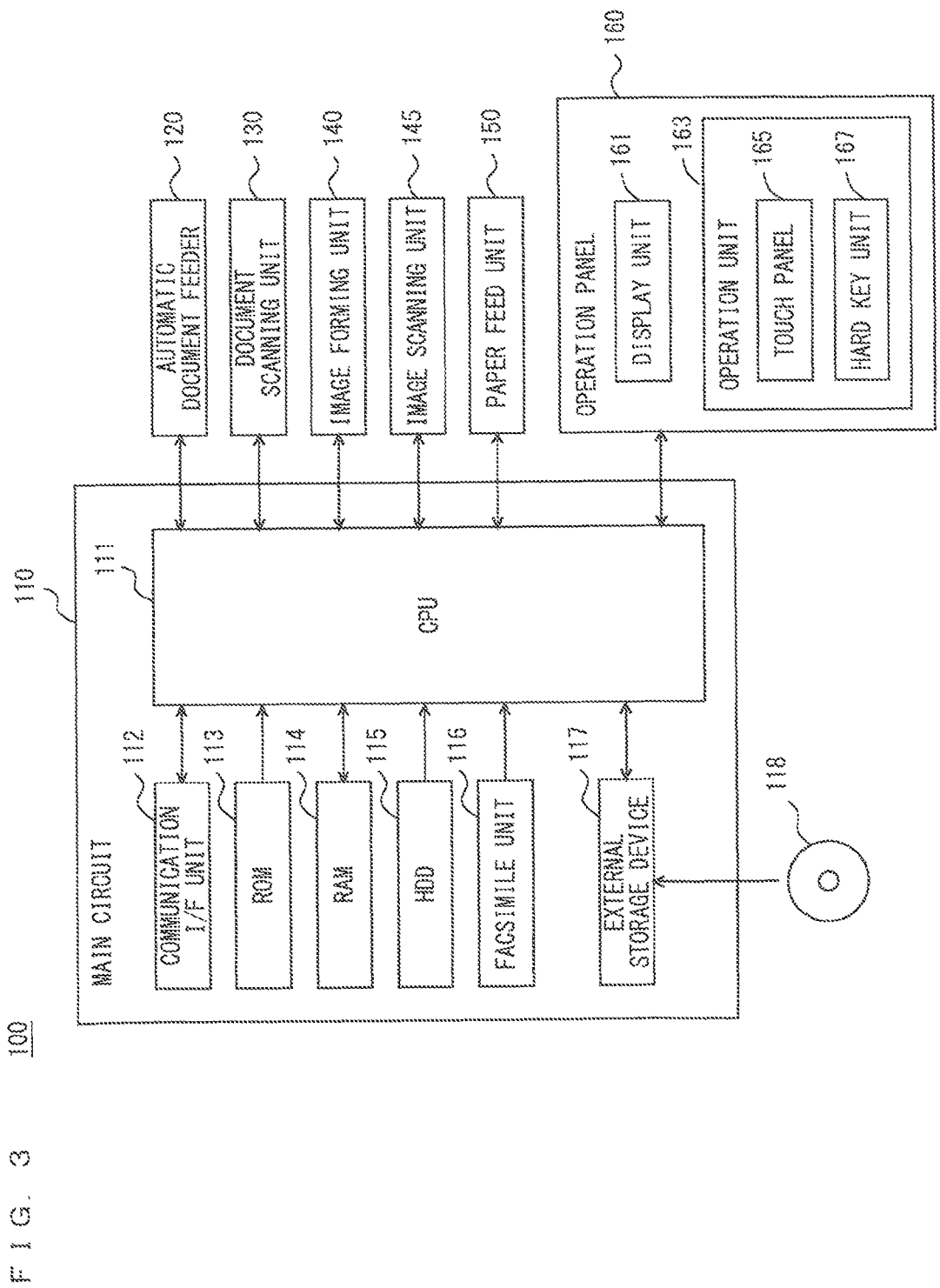
FIG. 3 is a block diagram showing an outline of a hardware configuration of an MFP according to one or more embodiments.

The hardware configurations and functions of the MFPs 100, 100A, 100B are basically the same. Therefore, the MFP 100 will be taken as an example here, unless otherwise specified. FIG. 3 is a block diagram showing an outline of the hardware configuration of the MFP 100 according to one or more embodiments. Referring to FIG. 3, the MFP 100 that functions as an image processing apparatus includes a main circuit 110, a document scanning unit 130 for scanning a document, an automatic document feeder 120 for conveying a document to the document scanning unit 130, an image forming unit 140 for forming an image on a sheet of paper or other medium based on image data output by the document scanning unit 130 that has scanned a document, a paper feed unit 150 for supplying sheets of paper to the image forming unit 140 and an operation panel 160 serving as a user interface.

The automatic document feeder 120 automatically conveys a plurality of documents set on a document tray to a predetermined document scanning position set on a platen glass of the document scanning unit 130 one by one, and discharges the document on which an image is formed and which is scanned by the document scanning unit 130 onto a document discharge tray. The document scanning unit 130 includes a light source that irradiates the document conveyed to the document scanning position with light and an optoelectronic transducer that receives the light reflected from the document, and scans the document image corresponding to a size of the document. The optoelectronic transducer converts the received light into image data, which is an electric signal, and outputs the image data to the image forming unit 140. The paper feed unit 150 conveys sheets of paper stored in the paper feed tray to the image forming unit 140.

The image forming unit 140 forms an image by a well-known electrophotographic method, forms an image on the sheet of paper transported by the paper feed unit 150 based on processed image data or image data (print data, described below) that is externally received, and discharges the sheet of paper on which the image is formed onto the discharge tray. The data process includes various data processes such as shading correction performed on the image data received from the document scanning unit 130.

The main circuit 110 includes a CPU 111 that controls the entire MFP 100, a communication interface (I/F) unit 112, a ROM 113, a RAM 114, a hard disc drive (HDD) 115 as a mass storage, a facsimile unit 116 and an external storage device 117. The CPU 111 is connected to the automatic document feeder 120, the document scanning unit 130, the image forming unit 140, the paper feed unit 150 and the operation panel 160 and controls the entire MFP 100.

The facsimile unit 116 is connected to the public switched telephone networks (PSTN) and transmits facsimile data to or receives facsimile data from the PSTN. The facsimile unit 116 stores the received facsimile data in the HDD 115, converts the data into print data that can be printed in the image forming unit 140 and outputs the print data to the image forming unit 140. Thus, the image forming unit 140 forms an image based on the facsimile data received by the facsimile unit 116 on a sheet of paper. Further, the facsimile unit 116 converts the data stored in the HDD 115 into facsimile data, and transmits the facsimile data to a facsimile machine connected to the PSTN.

The communication I/F unit 112 is an interface for connecting the MFP 100 to the LAN 3. The communication I/F unit 112 communicates with another computer or a data processing device connected to the network using a communication protocol such as the TCP (Transmission Control Protocol) or the FTP (File Transfer Protocol). Further, the network to which the communication I/F unit 112 is connected is not limited to the LAN 3 but may be a wide area network (WAN), a Public Switched Telephone Networks (PSTN) or the Internet.

The ROM 113 stores a program executed by the CPU 111 or data necessary for execution of the program. The RAM 114 is used as a work area when the CPU 111 executes the program. Further, the RAM 114 temporarily stores scanned image successively transmitted from the document scanning unit 130.

The operation panel 160 is provided on the top surface of MFP 100. The operation panel 160 includes a display unit 161 and an operation unit 163. The display unit 161 is a Liquid Crystal Display (LCD), for example, and displays instruction menus to users, information about the acquired image data and other information. For example, an organic EL (electroluminescence) display can be used instead of the LCD as long as the device displays images.

The operation unit 163 includes a touch panel 165 and a hard key unit 167. The touch panel 165 is a capacitance type. Not only the capacitance type but also another type such as a resistive film type, a surface acoustic wave type, an infrared type and an electromagnetic induction type can be used for the touch panel 165. The hard key unit 167 includes a plurality of hard keys. The hard keys are contact switches, for example The external storage device 117 is controlled by the CPU 111 and is mounted with the CD-ROM 118. The CPU 111 may control the external storage device 117, may read out a program executed by the CPU 111 from the CD-ROM 118 and may store the read program in the RAM 114 for execution.

It is noted that the recording medium for storing the program executed by the CPU 111 is not limited to the CD-ROM 118. It may be a flexible disc, a cassette tape, an optical disc, an IC card, an optical card, a semiconductor memory or the like. Further, the CPU 111 may download a program from a computer connected to the network and may store the program in the HDD 115. Alternatively, a computer connected to the network may write a program in the HDD 115, and the program stored in the HDD 115 may be loaded into the RAM 114 and executed in the CPU 111. The program referred to here includes not only a program directly executable by the CPU 111, but also a source program, a compressed program, an encrypted program and the like.

Figure 4:
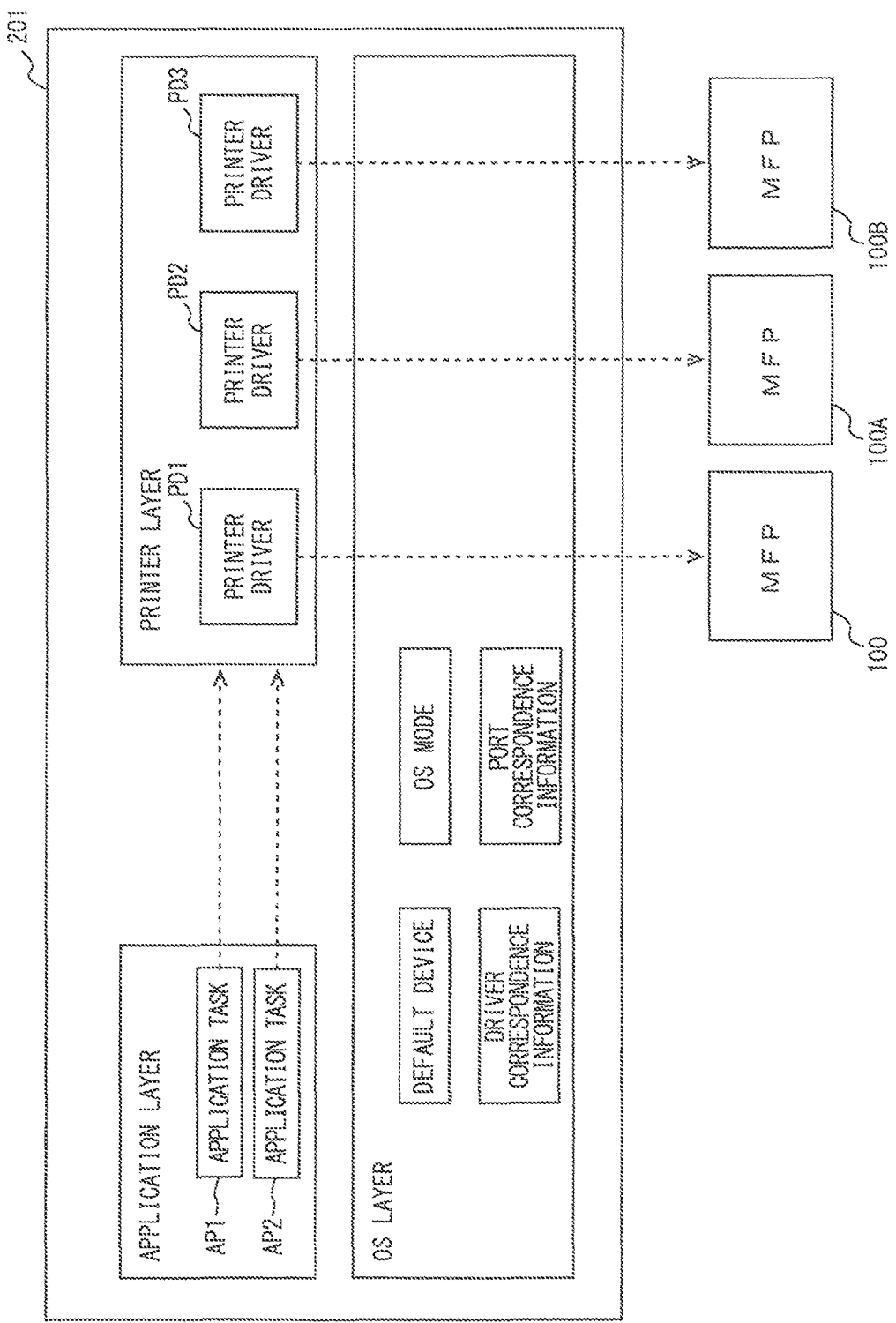
FIG. 4 is a diagram showing an example of a software architecture of a CPU included in the PC according to one or more embodiments.

FIG. 4 is a diagram showing an example of software architecture of the CPU 201 included in the PC 200. Referring to FIG. 4, in the CPU 201, an operating system (OS) layer is formed, and an application layer and a printer layer are respectively formed above the operating system layer.

An OS task formed in the case where the CPU 201 executes the OS program belongs to the OS layer. The OS task executes a process of controlling hardware resources of the PC 200. The hardware resources include the ROM 202, the RAM 203, the HDD 204, the communication unit 205, the display unit 206, the operation unit 207 and the external storage device 209. The OS task controls the hardware resources in accordance with an operating command received from the application layer.

The OS task sets one of the plurality of MFPs as a default device and notifies an application task of the set default device. Further, the OS task sets one of a changing mode in which the default device is automatically changed and a maintaining mode in which the default device is not changed and the same device is maintained as the default device as a mode. Hereinafter, the changing mode and the maintaining mode are collectively termed as the "OS mode". For example, the user can arbitrarily switch the OS modes on an interface (IF) screen generated by the OS task. In the present example, device identification information of the default device is stored in a predetermined default device storage region of the RAM 203 or the HDD 204, and the OS mode is stored in a predetermined OS mode storage region of the RAM 203 or the HDD 204.

The application task formed in the case where the CPU 201 executes an application program belongs to the application layer. In the case where a plurality of types of application programs are installed in the PC 200, a plurality of application tasks for respectively executing a plurality of application programs sometimes belong to the application layer. In the example of FIG. 4, two application tasks AP1, AP2 for respectively executing two types of application programs belong to the application layer. Each of the application tasks AP1, AP2 specifies a process to be executed from among a plurality of types of processes defined by the application program based on an instruction given by the user who operates the PC 200, and executes the specified process. The plurality of types of processes respectively defined by the application programs at least include a process of allowing the MFP 100 to print data generated by the application tasks AP1, AP2. Hereinafter, an MFP, which is allowed by the application task to print the data, among the plurality of MFPs 100, 100A, 100B is referred to as an "execution device".

A task (hereinafter referred to as a "printer driver") formed in the case where the CPU 201 executes the printer driver program belongs to the printer layer. In the case where a plurality of types of printer driver programs are installed in the PC 200, a plurality of printer drivers for respectively executing a plurality of printer driver programs sometimes belong to the printer layer. Further, in the case where a plurality of MFPs are controlled by execution of a common printer driver program, the plurality of printer drivers that execute the common printer driver program sometimes belong to the printer layer, and the number of the plurality of printer drivers is sometimes equal to the number of the plurality of MFPs. In the example of FIG. 4, three printer drivers PD1, PD2, PD3 that control the same or different types of the MFPs 100, 100A, 100B belong to the printer layer. Each of the printer drivers PD1, PD2, PD3 executes a process of controlling a corresponding control target device in accordance with data output by the application task. Here, the case where the printer driver PD1 controls the MFP 100 as the control target device, the printer driver PD2 controls the MFP 100A as the control target device, and the printer driver PD3 controls the MFP 100B as the control target device will be described as an example.

When the MFPs 100, 100A, 100B are connected to the CPU 201 via the LAN 3, the OS task respectively assigns output ports to the MFPs 100, 100A, 100B and generates port correspondence information. The port correspondence information includes a port correspondence record that associates the device identification information with a port number of an output port for each MFP 100, 100A, 100B. The device identification information is an IP (Internet Protocol) address, an MAC (Media Access Control) address, a name of a product or a model number, for example. Further, when the printer drivers PD1, PD2, PD3 are activated by execution of the printer driver program by the CPU 201, the OS task generates driver correspondence information that associates the device identification information of the MFP 100, 100A, 100B with the printer driver PD1, PD2, PD3.

In the case where allowing any one of the MFPs 100, 100A, 100B to print the generated data, each of the application tasks AP1, AP2 generates a selection screen for selection of an execution device and allows the display unit 206 to display the selection screen. The user selects an execution device by operating the operation unit 207 in accordance with the selection screen. Each of the application tasks AP1, AP2 can allow the plurality of MFPs 100, 100A, 100B, which are selectable as the execution devices, to be displayed in the selection screen with reference to the driver correspondence information generated by the OS task. Further, in the case where being initially displayed, the selection screen is displayed with any one default device, among the plurality of selectable MFPs 100, 100A, 100B, selected as the execution device. Therefore, in the case where selecting the default device as the execution device, the user can give an instruction for printing without performing an operation of designating an execution device on the selection screen. On the other hand, in the case where selecting a device other than the default device from among the plurality of MFPs 100, 100A, 100B as the execution device, the user performs an operation of designating the execution device on the selection screen, and then performs a print instruction operation. The MFP with high frequency of use is set as the default device by the OS task, whereby the user often does not have to perform an operation of designating an MFP on the selection screen, and convenience is enhanced.

Each of the application tasks AP1, AP2 designates the selected execution device and gives an instruction for printing in accordance with the print instruction operation by the user. Specifically, each of the application tasks AP1, AP2 outputs data to be printed (hereinafter referred to as "target data") to a printer driver corresponding to the selected execution device. While each of the application tasks AP1, AP2 directly outputs the target data to the printer driver corresponding to the execution device in the present example, the OS task may output the target data output from each of the application tasks AP1, AP2 to the printer driver corresponding to the execution device.

When receiving the target data from the application task, each of the printer drivers PD1, PD2, PD3 generates print data for printing of the target data under the set print condition and outputs the generated print data to the control target device. Each of the printer drivers PD1, PD2, PD3 determines which output port is assigned to the corresponding control target device with reference to the port correspondence information, and outputs the print data to the determined output port. The data output to the output port is output by the OS task to the device assigned to the output port. When the data is output front the output port, the OS task does not make reference to the port correspondence information. For example, in the case where the printer driver PD1 outputs the print data to the output port assigned to the MFP 100, the printer data is output to the MFP 100 by the OS task.

On the other hand, in the case where the print data is output from the output port, the OS task acquires device identification information for identifying the execution device. In the present example, the OS task acquires the device identification information associated with the output port from which the print data is output with reference to the port correspondence information, and determines that the device specified by the acquired device identification information among the MFPs 100, 100A, 100B is the execution device. In the case where each of the printer drivers PD1, PD2, PD3 outputs print instruction information including print data and port identification information indicating the output port to the OS task, the OS task outputs the print data from the output port specified by the port identification information included in the print instruction information, and determines that the device specified by the device identification information included in the print instruction information is the execution device.

In the case where a device different from the default device among the plurality of MFPs 100, 100A, 100B is designated as the execution device by the application task and then printing is performed, the OS task sets the designated execution device as the default device in the changing mode, and maintains the same device as the default device without setting the designated execution device as the default device in the maintaining mode. Specifically, in the case where the execution device that has output the print data is different from the default device, the OS task rewrites the device identification information stored in the predetermined default device storage region of the RAM 203 or the HDD 204 with the device identification information of the execution device in the changing mode, and maintains the device identification information stored in the default device storage region without rewriting it in the maintaining mode. For example, in the case where the MFP 100A is set as the default device, and the print data is output to an output port assigned to the MFP 100B from the printer driver PD2, the MFP 100B is set as the default device in the changing mode, and the MFP 100A is maintained as the default device in the maintaining mode. In the case where the execution device and the default device are the same device, the default device is not changed in either the changing mode or the maintaining mode. Each of the printer drivers PD1. PD2, PD3 may output print instruction information including device identification information of the control target device. In this case, the OS task may specify any one of the MFPs 100, 100A, 100B as the execution device based on the device identification information included in the print instruction information output by any one of the printer drivers PD1, PD2, PD3.

Each of the printer drivers PD1, PD2, PD3 has a default device maintaining function, and the same MFP can be maintained as the default device before and after printing is performed by the control target device. Details of the functions of the printer drivers PD1, PD2, PD3 will be described below.

Figure 5:
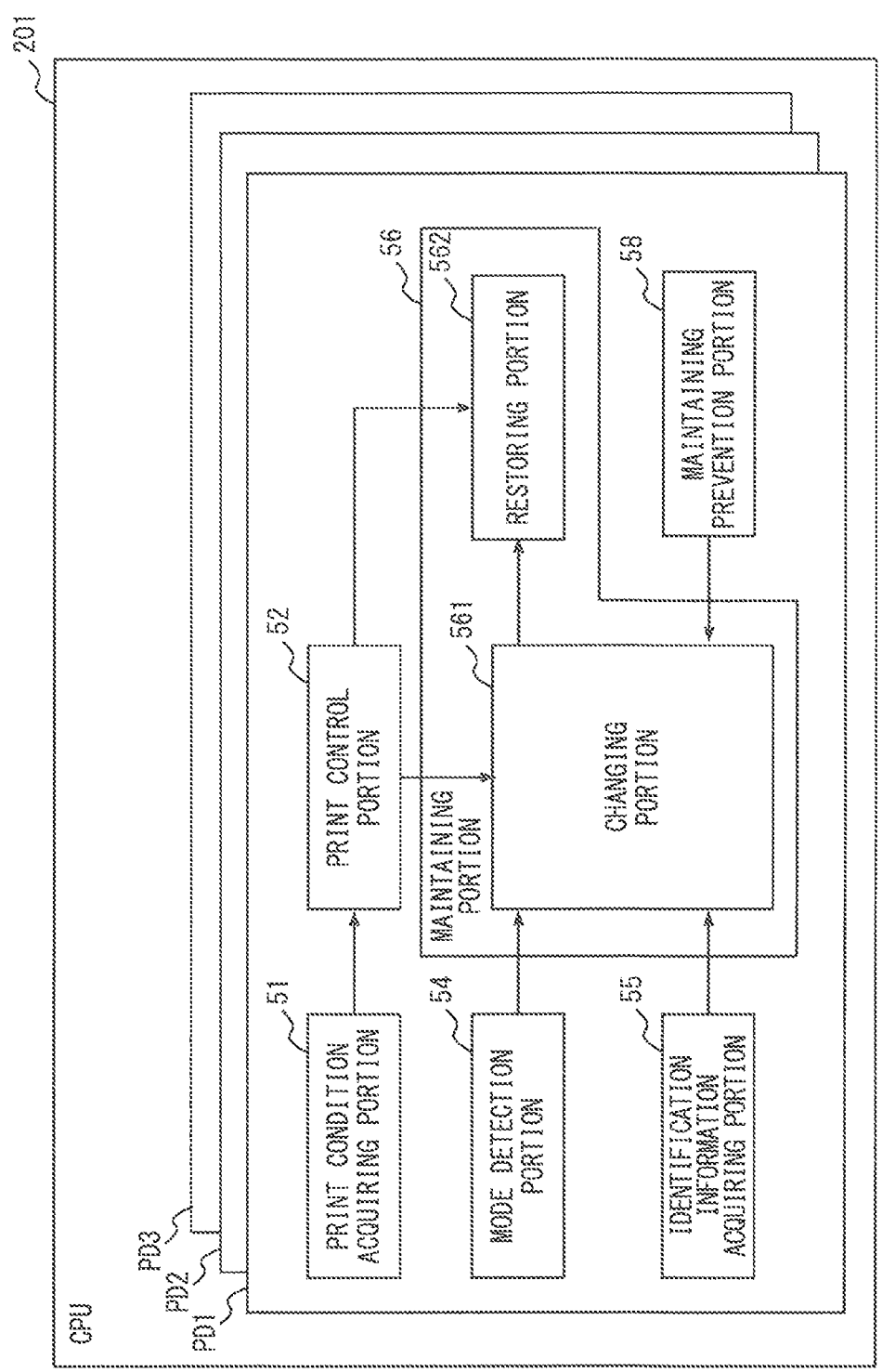
FIG. 5 is a block diagram showing an example of functions of the CPU included in the PC according to one or more embodiments.

FIG. 5 is a block diagram showing an example of functions of the CPU 201 included in the PC 200 according to one or more embodiments. In the present example, the functions shown in FIG. 5 are functions of a printer driver and are realized in the case where the CPU 201 included in the PC 200 executes each of a plurality of printer driver programs stored in the ROM 202, the HDD 204 or the CD-ROM 209A. The functions shown in FIG. 5 may be realized by hardware instead of the CPU 201 and the program.

Referring to FIG. 5, the CPU 201 included in the PC 200 includes a print condition acquiring portion 51, a print control portion 52, a mode detection portion 54, an identification information acquiring portion 55, a maintaining portion 56 and a maintaining prevention portion 58 as functions of each of the printer drivers PD1, PD2, PD3.

The print condition acquiring portion 51 acquires print conditions such as a size of paper, a page layout and whether a sorter is used. The print condition is not limited to these and may be a print condition required for a process executable by the MFP 100. For example, the print condition acquiring portion 51 generates a condition setting screen for setting the print condition and allows the display unit 206 to display the condition setting screen. The user can set the print condition by operating the operation unit 207 in accordance with the condition setting screen. The print condition acquiring portion 51 acquires the print condition set in the condition setting screen. Alternatively, the print condition may be accepted when the application task selects the execution device, and the print condition acquiring portion 51 may receive the print condition from the application task. The print condition acquiring portion 51 outputs the acquired print condition to the print control portion 52.

The print control portion 52 receives the print condition from the print condition acquiring portion 51, and receives the target data from the application task. In response to being instructed to perform printing by the application task, the print control portion 52 allows one MFP defined as the control target device among the plurality of MFPs to perform printing. Specifically, when receiving the target data, the print control portion 52 generates print data for printing the target data under the input print condition, and outputs the print instruction information including the generated print data and port identification information. Further, the print control portion 52 outputs instruction acceptance information, indicating that printing has been instructed by the application task, to the maintaining portion 56 before outputting the print instruction information, and outputs print completion information to the maintaining portion 56 after outputting the print instruction information.

The mode detection portion 54 acquires an OS mode set in the OS task and outputs the acquired OS mode to the maintaining portion 56. The identification information acquiring portion 55 acquires the device identification information of the default device set by the OS task and outputs the device identification information to the maintaining portion 56. The mode detection portion 54 and the identification information acquiring portion 55 acquire the OS mode and the device identification information of the default device with reference to the OS mode storage region and the default device storage region of the RAM 203 or the HDD 204.

The maintaining portion 56 includes a changing portion 561 and a restoring portion 562 and maintains the same MFP as the default device before and after printing is performed by the control target device. Before the print control portion 52 allows the control target device to perform printing, the changing portion 561 receives the instruction acceptance information from the print control portion 52, receives the OS mode from the mode detection portion 54 and receives the device identification information of the default device from the identification information acquiring portion 55. In the case where the received OS mode is the changing mode, the changing portion 561 changes the OS mode from the changing mode to the maintaining mode before the print control portion 52 allows the control target device to perform printing. After changing the OS mode to the maintaining mode, the changing portion 561 outputs change completion information to the restoring portion 562. In the case where the OS mode received from the mode detection portion 54 is the maintaining mode, the changing portion 561 does not change the OS mode and does not output the change completion information to the restoring portion 562.

For example, in the case where the received OS mode is the changing mode, in response to reception of the instruction acceptance information, the changing portion 561 rewrites the OS mode stored in the OS mode storage region of the RAM 203 or the HDD 204 with the maintaining mode. Alternatively, the changing portion 561 may output a mode change instruction to the OS task in response to reception of the instruction acceptance information, and the OS task may change the OS mode from the changing mode to the maintaining mode in response to reception of the mode change instruction from the changing portion 561. After the OS mode is changed to the maintaining mode, the print control portion 52 outputs the print data to the output port assigned to the control target device. In this case, even if the control target device is different front the default device, because the OS mode is changed to the maintaining mode, the OS task does not change the default device.

The restoring portion 562 receives the print completion information from the print control portion 52. In the case where receiving the change completion information from the changing portion 561, after the print control portion 52 allows the control target device to print, the restoring portion 562 changes the OS mode that has been changed to the maintaining mode by the changing portion 561 to the changing mode. Specifically, when receiving the print completion information and receiving the change completion information, the restoring portion 562 rewrites the OS mode stored in the OS storage region of the RAM 203 or the HDD 204 with the changing mode. Alternatively, the restoring portion 562 may output the mode change instruction to the OS task, and the OS task may change the OS mode from the maintaining mode to the changing mode in response to reception of the mode change instruction from the restoring portion 562. Thus, after the print instruction information is output from the print control portion 52, the OS mode is restored to the changing mode.

The maintaining prevention portion 58 can prevent the maintaining portion 56 from maintaining the default device. For example, the maintaining prevention portion 58 accepts selection of whether the default device maintaining function is enabled. In the case where enabling of the default device maintaining function is selected, the maintaining portion 56 changes the OS mode before and after the printing is performed by the control target device as described above, whereby the same MFP is maintained as the default device. On the other hand, in the case where disabling of the default device maintaining function is selected, the maintaining prevention portion 58 prevents the maintaining portion 56 from changing the OS mode. In this case, the OS task operates in the OS mode that has been previously set. Therefore, in the case where the OS mode is the changing mode, and the default device is different from the control target device, the default device is changed and the control target device is set as the default device.

Figure 6:
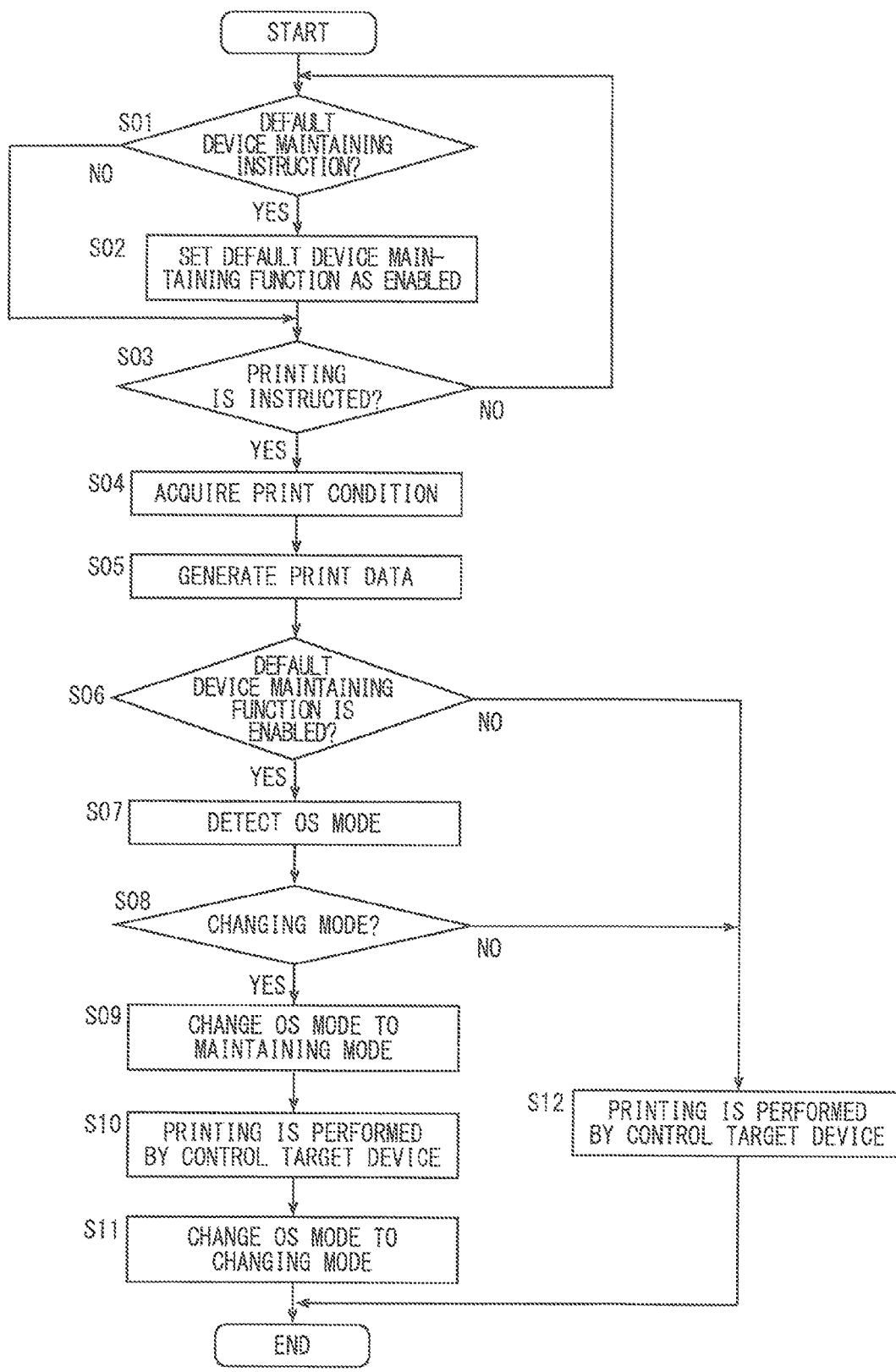
FIG. 6 is a flow chart showing an example of a flow of a default device maintaining process according to one or more embodiments.

FIG. 6 is a flow chart showing an example of a flow of a default device maintaining process according to one or more embodiments. The default device maintaining process is a process executed by the CPU 201 in the case where the CPU 201 included in the PC 200 executes the printer driver program stored in the ROM 202, the HDD 204 or the CD-ROM 209A. The default device maintaining process is executed for each printer driver. In FIG. 6, the default device maintaining process executed by one printer driver (hereinafter referred to as a "target driver") is shown.

Referring to FIG. 6, the CPU 201 determines whether a default device maintaining instruction of a target driver has been supplied from the user (step S01). For example, the user operates the operation unit 207 and selects enabling of the default device maintaining function, thereby supplying the default device maintaining instruction. In the case where the default device maintaining instruction is supplied, the process proceeds to the step S02. If not, the process proceeds to the step S03.

In the step S02, the default device maintaining function of the target driver is set as enabled, and the process proceeds to the step S03. In the step S03, the CPU 201 determines whether an instruction for printing has been given by the application task (step S01). Specifically, the CPU 201 determines whether the target driver has received the target data from the application task. For example, when the user selects the control target device of the target driver on the selection screen generated by the application task and performs the print instruction operation, the target driver receives the target data. In the case where printing is instructed, the process proceeds to the step S04. If not, the process returns to the step S01.

In the step S04, the CPU 201 acquires the set print condition, and the process proceeds to the step S05. In this case, the preset print condition may be acquired, or the print condition, set by the user on the condition setting screen generated by the application task or the target driver, may be acquired. In the step S05, the CPU 201 generates the print data for printing the target data received in the step S03 under the print condition acquired in the step S04, and the process proceeds to the step S06.

In the step S06, the CPU 201 determines whether the default device maintaining function of the target driver is enabled. In the case where the default device maintaining function is enabled, the process proceeds to the step S07. If not, the process proceeds to the step S12. In the step S07, the CPU 201 detects the OS mode of the OS task, and the process proceeds to the step S08. In the step S08, the CPU 201 determines whether the detected OS mode is the changing mode. In the case where the detected OS mode is the changing mode, the process proceeds to the step S09. If not, the process proceeds to the step S12.

In the step S09, the OS mode is changed to the maintaining mode, and the process proceeds to the step S10. Specifically, the target driver rewrites the OS mode with the maintaining mode. Alternatively, the target driver outputs the mode change instruction to the OS task, and the OS task changes the OS mode to the maintaining mode in response to the mode change instruction.

In the step S10, the CPU 201 allows the control target device of the target driver to print the print data by outputting the print instruction information including the generated print data and the port identification information, and the process proceeds to the step S11. In this case, the maintaining mode is set as the OS mode, so that the default device is not changed.

In the step S11, the CPU 201 changes the OS mode of the OS task to the change mode, and the process ends. Specifically, the target driver rewrites the OS mode with the maintaining mode. Alternatively, the target driver outputs the mode change instruction to the OS task, and the OS task changes the OS mode to the changing mode in response to the mode change instruction.

In the step S12, similarly to the step S10, the CPU 201 allows the control target device of the target driver to print the print data by outputting the print instruction information including the print data and the port identification information, and the process ends. In this case, the OS mode is not changed by the target driver, and the OS task operates in the OS mode that has been previously set. Therefore, in the case where the OS mode is the changing mode, and the default device is a device different from the execution device (the control target device of the target driver), the execution device is set as the default device.

As described above, even in the case where the execution device that is a device different from the default device is designated by the application task, and the execution device is allowed to perform printing, the PC 200 according to one or more embodiments maintains the same image forming apparatus as the default device before and after the control target device (the execution device), which is to be controlled by the printer driver controlling the execution device, performs printing. Thus, it is possible not to allow the OS task to change the default device, and it is not necessary for the user to reset the default device. As a result, the user is prevented from involving in extra labor, and degradation of convenience for the user can be prevented.

Further, in the case where the OS mode is the changing mode, the PC 200 changes the OS mode from the changing mode to the maintaining mode before allowing the control target device to perform printing. Thus, the OS task can be easily prevented from changing the default device against intension of the user.

Further, after the control target device has performed printing, the PC 200 changes the OS mode that has been changed to the maintaining mode to the changing mode.

Thus, after the printer driver has performed printing using the control target device, the mode that has been set before printing can be maintained in the operating system. Therefore, in the case where the user does not wish to maintain the default device, it is possible to set the execution device as the default device using the function of the OS task by disabling the default device maintaining function.

Figure 7:
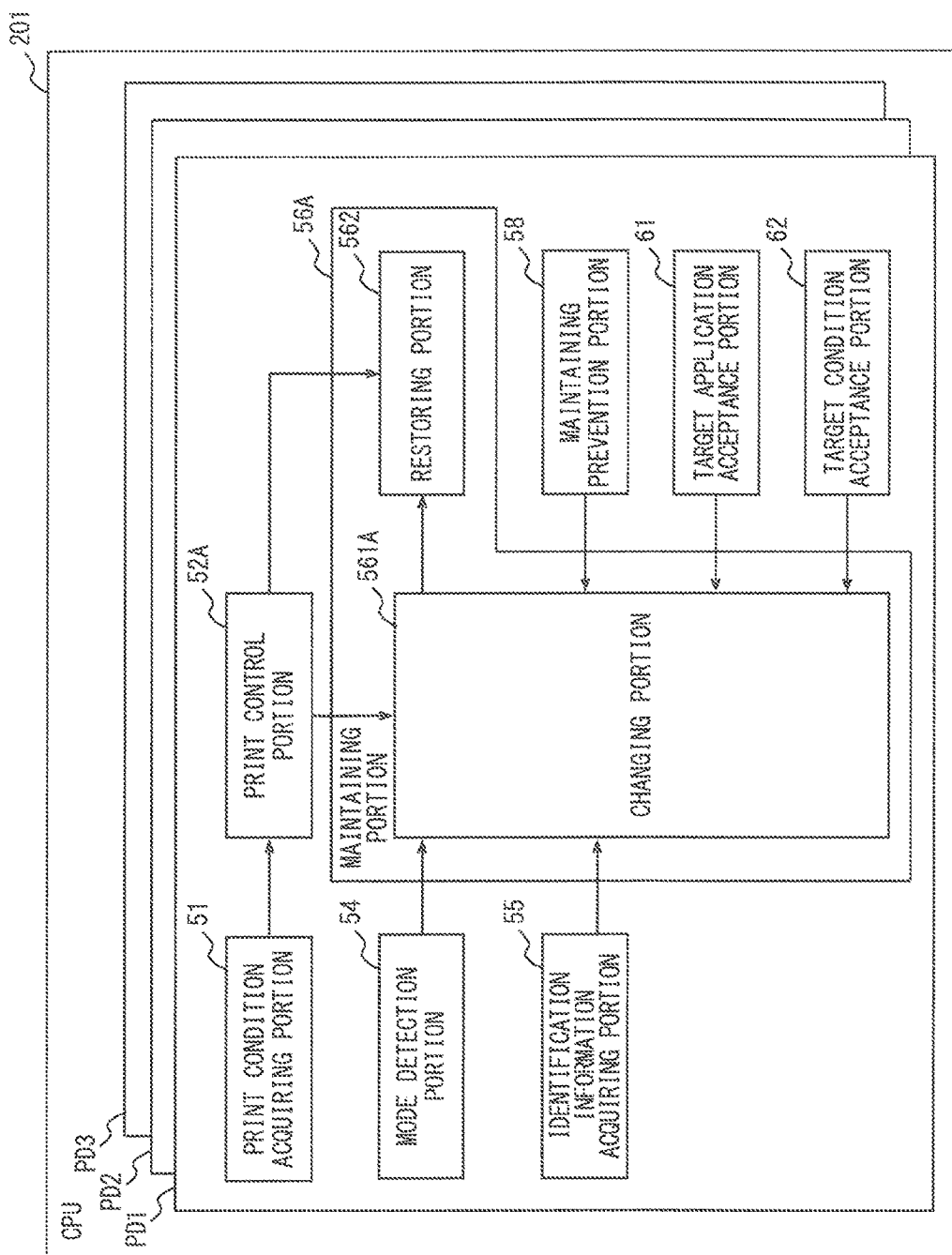
FIG. 7 is a block diagram showing an example of functions of a CPU included in a PC in a modified example of the embodiments.

FIG. 7 is a block diagram showing an example of functions of a CPU 201 included in a PC 200 in the modified example of the above-mentioned embodiments. Referring to FIG. 7, differences of functions of the CPU 201 in the modified example from the functions shown in FIG. 5 are that a target application acceptance portion 61 and a target condition acceptance portion 62 are added, the print control portion 52 is changed to a print control portion 52A and the maintaining portion 56 is changed to a maintaining portion 56A.

The target application acceptance portion 61 accepts setting of a target application program that is a target of the default device maintaining function of a plurality of types of application programs installed in the PC 200, and outputs target application information indicating the set target application program to the maintaining portion 56A. Hereinafter, the target application program is abbreviated as a "target application". The target condition acceptance portion 62 accepts setting of a target condition, which applies to the default device maintaining function, of the selectable print conditions, and supplies the set target condition to the maintaining portion 56A. For example, the target application acceptance portion 61 and the target condition acceptance portion 62 generate a common target setting screen for setting the target application and the target condition, and allows the display unit 206 to display the target setting screen. The user can operate the operation unit 207 and set the target application and the target condition on the target setting screen.

Figure 8:
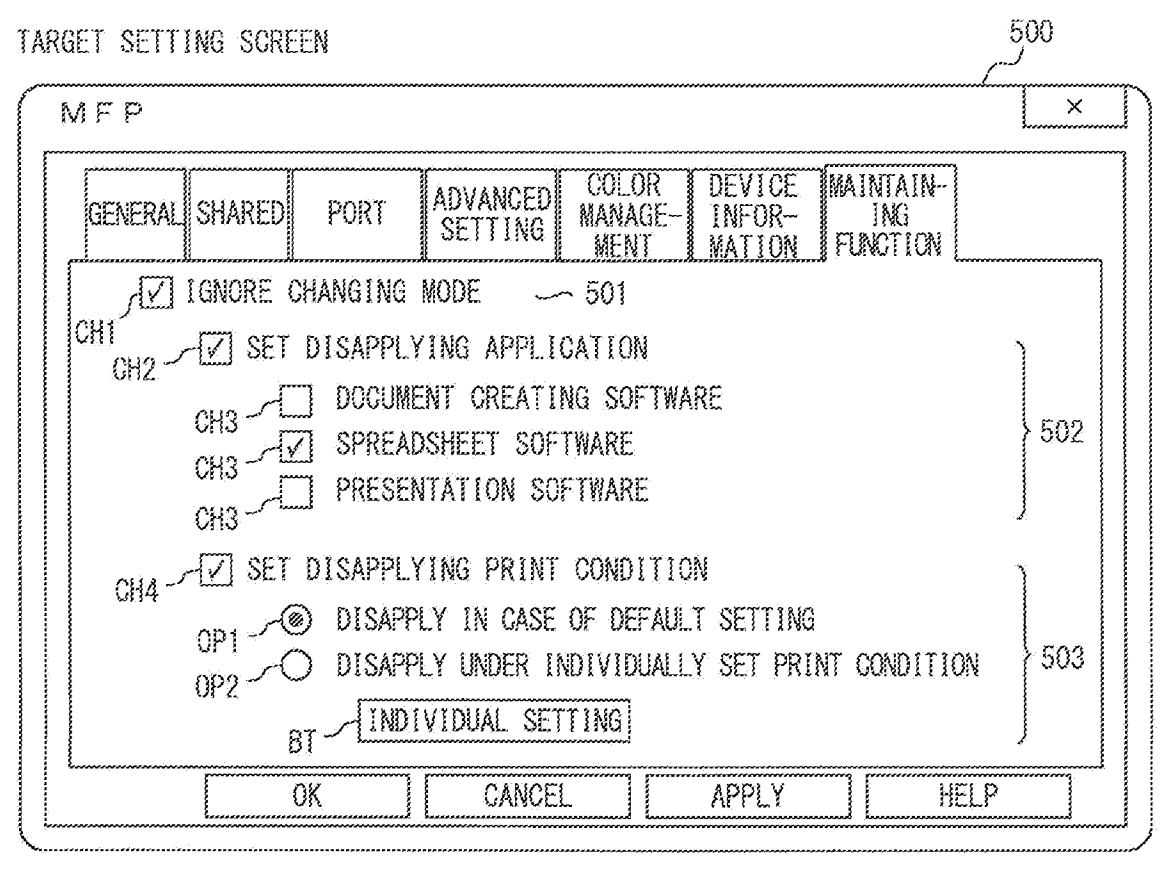

FIG. 8 is a diagram showing an example of the target setting screen. Referring to FIG. 8, the target setting screen 500 is displayed in a window that is displayed as an interface (IF) screen of the control target device in the case where one of a plurality of tabs is selected. The target setting screen 500 includes an enabling disabling selection region 501, a target application setting region 502 and a target condition setting region 503. In the enabling disabling selection region 501, whether the default device maintaining function is enabled can be selected. A check box CH1 is displayed in the enabling disabling selection region 501. In the case where ignoring the changing mode, the user ticks the check box CH1. In the case where the check box CH1 is ticked, the default device maintaining function is enabled, and the target application and the target condition can be set. In the case where the check box CH1 is not ticked, the default device maintaining function is disabled, and the maintaining prevention portion 58 prevents the maintaining portion 56 from maintaining of the default device.

In the target application setting region 502, the target application can be set. In the target application setting region 502, a check box CH2, types of application programs installed in the PC 200 and check boxes CH3 respectively corresponding to these application programs are displayed. In the target setting screen 500 of FIG. 8, "DOCUMENT CREATING SOFTWARE", "SPREADSHEET SOFTWARE" and "PRESENTATION SOFTWARE" are displayed as types of installed application programs. The "DOCUMENT CREATING SOFTWARE" indicates a type of an application program for creating or editing documents. The "SPREADSHEET SOFTWARE" indicates a type of an application program for spreadsheets. The "PRESENTATION SOFTWARE" indicates a type of an application program for creating materials for presentation.

In the case where setting the target application, the user ticks the check box CH2. In the target setting screen 500 of FIG. 8, "DISAPPYING APPLICATION" means an application program to which the change of the default device in the changing mode does not apply, that is, the target application. In the case where ticking the check box CH2, the user ticks the check box CH3 corresponding to the application program that is to be a target of the default device maintaining function among a plurality of check boxes CH3. The application program corresponding to the ticked check box CH3 is set as the target application. In the case where the check box CH2 is not ticked, none of the installed application programs is set as the target application.

In the target condition setting region 503, the target condition can be set. In the present example, a check box CH4, option buttons OP1, OP2 and an individual setting button BT are displayed in the target condition setting region 503. In the case where setting the target condition, the user ticks the check box CH4. In the target setting screen 500 of FIG. 8, "DISAPPLYING PRINT CONDITION" means a print condition under which the change of the default device in the changing mode does not apply, that is, the target condition. In the case where ticking the check box CH4, the user selects one of the option buttons OP1, OP2. In the case where the operation button OP1 is selected, a default setting of the print condition is set as the target condition. In the case where the option button OP2 is selected, an individually set condition is set as the target condition. When the individual setting button BT is selected, an individual setting screen for individually setting a condition to be the target condition is displayed. In the case where the operation button OP2 is selected, the condition that has been set on the individual setting screen is set as the target condition. In the case where the check box CH4 is not ticked, none of the print conditions is set as the target condition.

As for the setting of the target condition, the case where printing is performed with use of a sorter function will be described as an example. The sorter function is a function of, in the case where printing matter with a plurality of pages are printed in a plurality of sets, outputting each set of pages together. For example, the MFP 100A has the sorter function, and the MFPs 100, 100B do not have the sorter function. For example, the MFP 100B is set as the default device. In the case where frequency of use of the sorter function is low, and the sorter function is only used about once a week, for example, it is convenient if a print condition corresponding to the sorter function is set as the target condition of the printer driver PD2 that controls the MFP 100A. Specifically, in the case where printing is performed with use of the sorter function, the user designates the MFP 100A as the execution device, and sets the print condition corresponding to the sorter function as the target condition. In this case, although printing is performed in the MFP 100A by the printer driver PD2, the MFP 100B is maintained as the default device.

On the other hand, due to a reason such as a trouble of the MFP 100B, the user may designate the MFP 100A as the execution device, and may select a regular condition not including the use of the sorter function as the print condition. In this case, printing is executed in the MFP 100A by the printer driver PD2, so that the default device is changed, and the MFP 100A is set as the default device. Thus, the user can use the MFP 100A on a daily basis instead of the MFP 100B which does not work well. In this manner, a print condition with low frequency of use is set as the target condition, whereby it is possible to benefit from the change of the default device by the OS task when necessary while preventing the default device from being unnecessarily changed by the OS task.

While the target application and the target condition are set in the common target setting screen 500 in the present example, the target application acceptance portion 61 and the target condition acceptance portion 62 may individually generate an IF screen for setting the target application and an IF screen for setting the target condition, and may allow the display unit 206 to display them.

Referring to FIG. 7, in response to being instructed to perform printing by the application task, the print control portion 52A outputs the instruction acceptance information, the execution application information indicating an application program executed by an application task that has given an instruction for printing and the print condition received from the print condition acquiring portion 51 to the maintaining portion 56A.

In the case where being instructed to perform printing by the application task that executes the target application, the maintaining portion 56A maintains the same MFP as the default device before and after printing is performed by the control target device. Further, in the case where the print condition includes the target condition, the maintaining portion 56A maintains the same MFP as the default device before and after printing is performed by the control target device. Specifically, the maintaining portion 56A includes a changing portion 561A instead of the changing portion 561. Before the print control portion 52A allows the control target device to perform printing, the changing portion 561A receives the instruction acceptance information, the execution application information and the print condition from the print control portion 52A, receives the target application information from the target application acceptance portion 61, and receives the target condition from the target condition acceptance portion 62. In the case where the received OS mode is the changing mode, and the application program specified by the received execution application information is the same as the application program specified by the received target application information, the changing portion 561A changes the OS mode from the changing mode to the maintaining mode before the print control portion 52 allows the control target device to perform printing. Further, in the case where the received OS mode is the changing mode, and the received print condition includes the received target condition, the changing portion 561A changes the OS mode from the changing mode to the maintaining mode before the print control portion 52 allows the control target device to perform printing.

Figure 9:
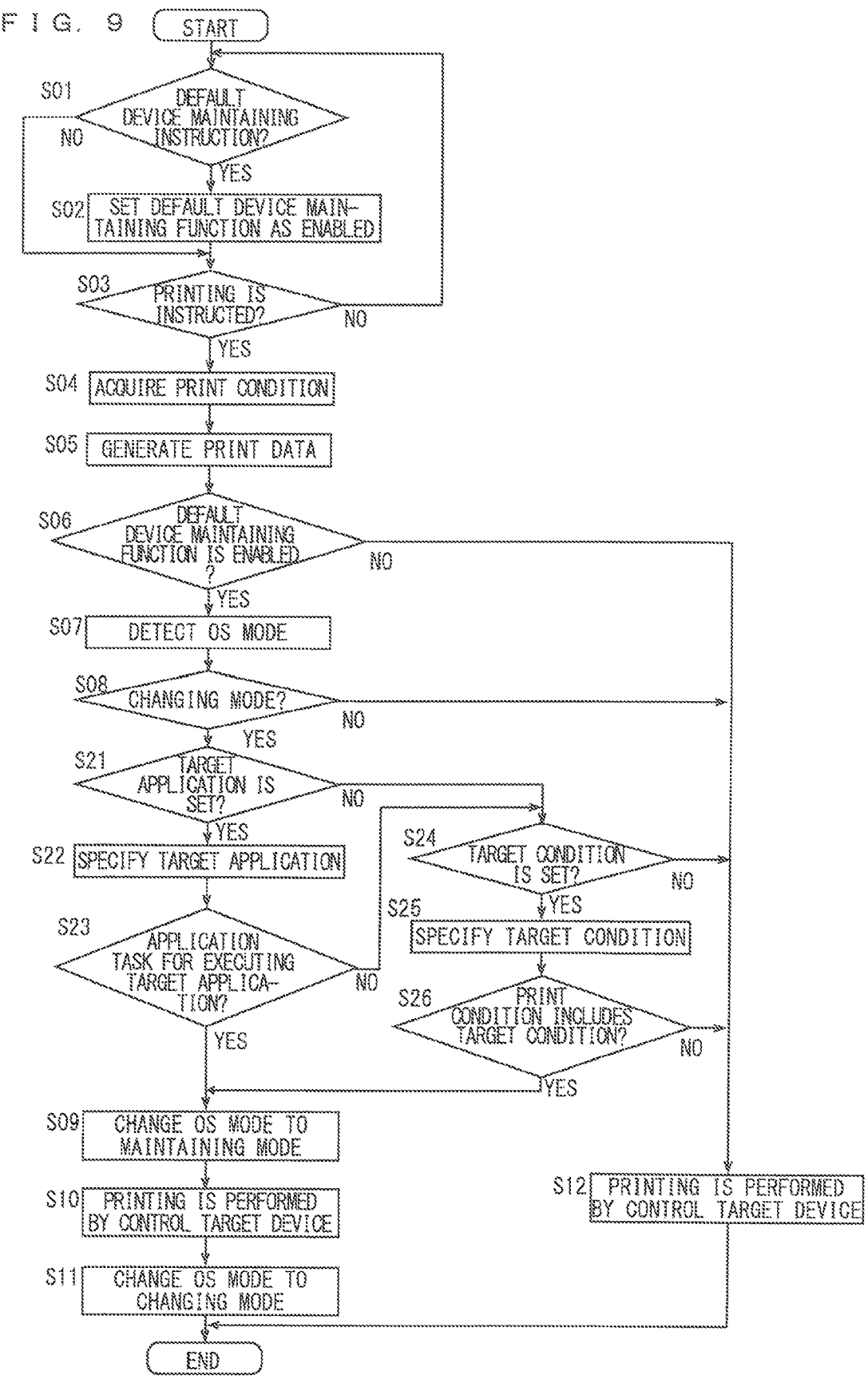
FIG. 9 is a flow chart showing an example of a flow of a default device maintaining process in the modified example of the embodiments.

FIG. 9 is a flow chart showing an example of a flow of a default device maintaining process in the modified example of the above-mentioned embodiments. Referring to FIG. 9, the default device maintaining process in the modified example is different from the process shown in FIG. 6 in that the steps S21 to S26 are added between the step S08 and the step S09. The rest of the process is the same as the process shown in FIG. 6. A description therefore will not be repeated.

In the step S21, the CPU 201 determines whether the target application is set. For example, in the case where the check box CH2 is ticked in the target application setting region 502 of the target setting screen 500 of FIG. 8, it is determined that the target application is set, and the process proceeds to the step S22. If not, the process proceeds to the step S24. In the step S22, the target application is specified.

For example, an application program with a ticked check box CH3 in the target application setting region 502 of the target setting screen 500 of FIG. 8 is specified as the target application.

In the step S23, the CPU 201 determines whether the application task that has given an instruction for printing in the step S03 is an application task for executing the target application specified in the step S22. In the case where the application task that has given an instruction for printing is the application task for executing the target application, the process proceeds to the step S09. If not, the process proceeds to the step S24.

In the step S24, the CPU 201 determines whether the target condition is set. For example, in the case where the check box CH4 is ticked in the target condition setting region 503 of the target setting screen 500 of FIG. 8, it is determined that the target condition is set, and the process proceeds to the step S25. If not, the process proceeds to the step S12. In the step S25, the target condition is specified. For example, in the case where the option button OP1 is selected in the target condition setting region 503 of the target setting screen 500 of FIG. 8, the default setting of the print condition is set as the target condition. In the case where the operation button OP2 is selected, the individually set condition is specified as the target condition.

In the step S26, the CPU 201 determines whether the print condition acquired in the step S04 includes the target condition specified in the step S25. In the case where the print condition includes the target condition, the process proceeds to the step S09. If not, the process proceeds to the step S12.

In this manner, in the case where accepting the setting of the target application program of the plurality of types of application programs and being instructed to perform printing by the application task that executes the target applicant program, the PC 200 in the modified example of the above-mentioned embodiments maintains the same image forming apparatus as the default device before and after printing is performed by the control target device. Further, in the case where the PC 200 accepts the setting of the target condition of the selectable print conditions, and the acquired print condition includes the set target condition, the PC 200 maintains the same image forming apparatus as the default device before and after printing is performed by the control target device. Thus, whether the default device is changed by the OS task can be changed depending on the application program and the print condition. Therefore, only in the case where printing is performed under a condition desired by the user, the same device can be maintained as the default device before and after printing. As a result, convenience for the user is improved.

While both settings of the target application and the target condition are accepted by the target application acceptance portion 61 and the target condition acceptance portion 62 in the present example, the function of the CPU 201 included in the PC 200 may include one of the target application acceptance portion 61 and the target condition acceptance portion 62, and only one setting of the target application and the target condition may be accepted.

Figure 10:
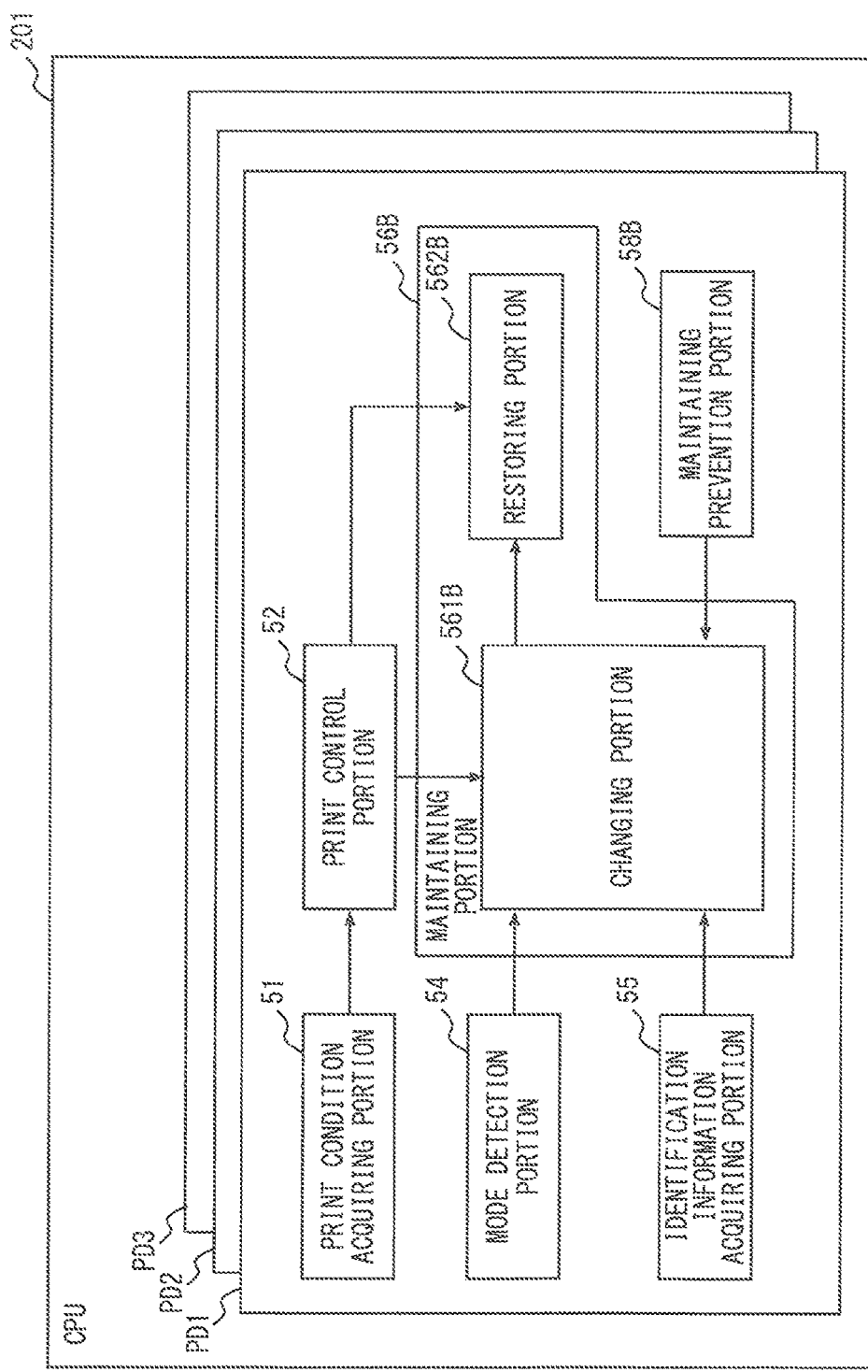
FIG. 10 is a block diagram showing an example of functions of a CPU included in a PC according to one or more embodiments.

FIG. 10 is a block diagram showing an example of functions of a CPU 201 included in a PC 200 according to one or more embodiments. Referring to FIG. 10, functions of the CPU 201 according to one or more embodiments are different from the functions shown in FIG. 5 in that the maintaining portion 56 is changed to a maintaining portion 56B, and the maintaining prevention portion 58 is changed to a maintaining prevention portion 58B.

In the case where the OS mode is the changing mode, and the default device is different from the control target device, in response to reception of an instruction for printing by the control target device given by the application task, the maintaining portion 56B allows the OS task to acquire the device identification information of the default device instead of the device identification information of the control target device.

The maintaining portion 56B includes a changing portion 561B and a restoring portion 562B instead of the changing portion 561 and the restoring portion 562. Before the print control portion 52 allows the control target device to perform printing, the changing portion 561B receives print instruction information from the print control portion 52, receives an OS mode from the mode detection portion 54 and receives device identification information of the default device from the identification information acquiring portion 55. In the case where the received OS mode is the changing mode, and the default device specified by the received device identification information is different from the control target device, the changing portion 561B changes port correspondence information in response to reception of print instruction information. Specifically, the changing portion 561B changes the device identification information corresponding to an output port assigned to the control target device from the device identification information of the control target device to the device identification information of the default device in the port correspondence information. After the port correspondence information is changed, the print control portion 52 outputs print data to an output port assigned to the control target device.

The OS task outputs the print data from the output port assigned to the control target device, and then determines with reference to the port correspondence information that the device, specified by the device identification information corresponding to the output port from which the print data has been output, among the MFPs 100, 100A, 100B is the execution device. In the case where the OS mode is the changing mode, and the control target device is different from the default device, the device identification information of the port correspondence information is rewritten by the changing portion 561B. Therefore, the OS task determines that not the MFP that has actually performed printing, but the default device is the execution device. Therefore, the OS task determines that the default device and the execution device are the same device, and does not change the default device. Thus, the same MFP is maintained as the default device before and after printing is performed by the control target device.

After changing the port correspondence information, the changing portion 561B outputs change completion information to the restoring portion 562B. In the case where the print completion information is received from the print control portion 52, and the port correspondence information is changed, the restoring portion 562B receives the change completion information from the changing portion 561B. The print control portion 52 allows the control target device to perform printing, and then the restoring portion 562B changes back the port correspondence information that has been changed by the changing portion 561B to the previous state before the change. Specifically, when receiving the print completion information and receiving the change completion information, the restoring portion 561B changes the device identification information corresponding to the output port assigned to the control target device from the device identification information of the default device to the device identification information of the control target device in the port correspondence information.

The maintaining prevention portion 58B can prevent the maintaining portion 56B from maintaining the default device. Specifically, in the case where disabling of the default device maintaining function is selected, the maintaining prevention portion 58B prevents the changing portion 561B from changing the port correspondence information. In this case, the OS task determines which one of the MFPs 100, 100A, 100B has actually performed printing with reference to the port correspondence information. Therefore, in the case where the OS mode is the changing mode, and the device set as the default device is different from the execution device, the execution device is set as the default device.

Figure 11:
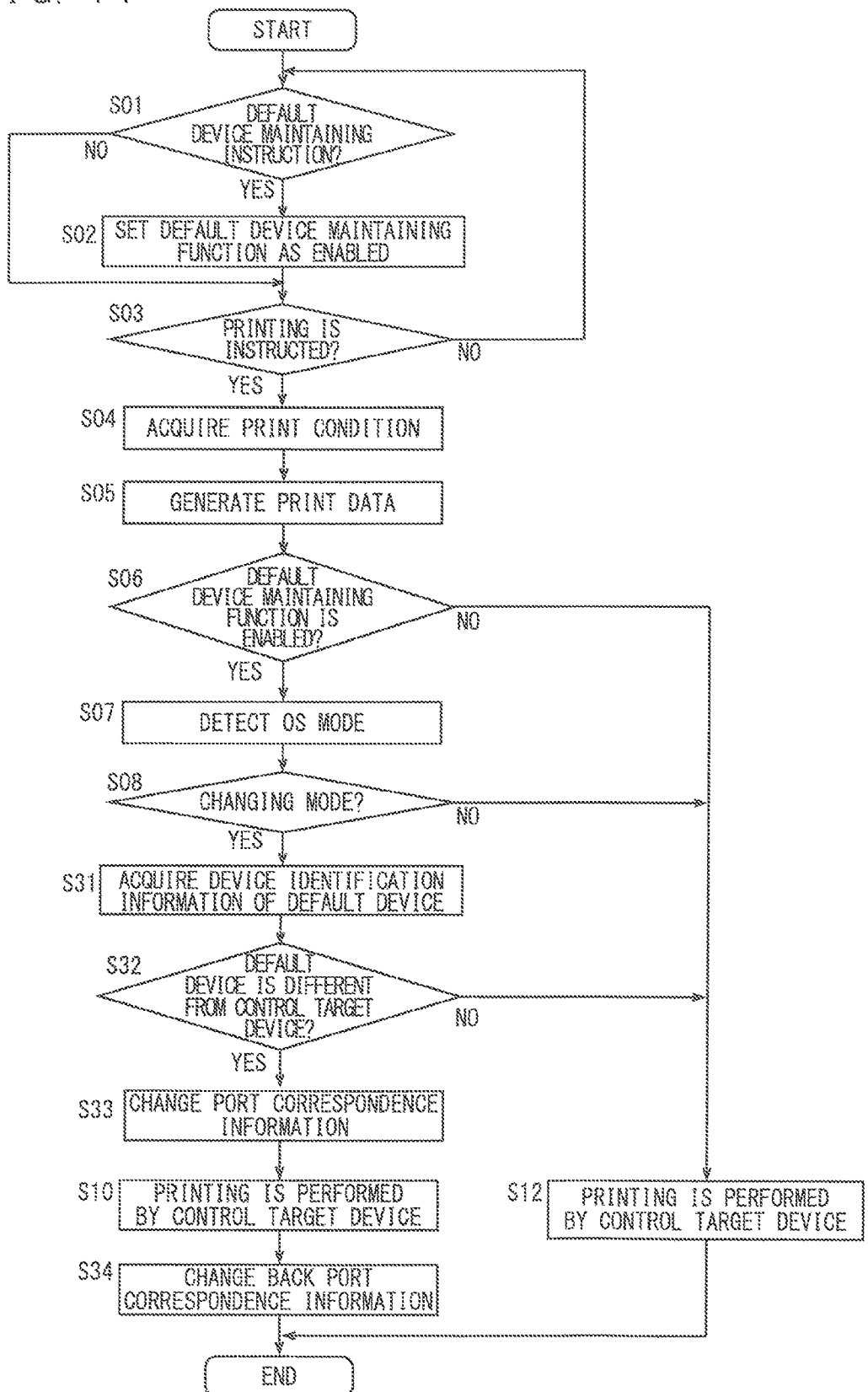
FIG. 11 is a flow chart showing an example of a flow of a default device maintaining process according to one or more embodiments.

FIG. 11 is a flow chart showing an example of a flow of a default device maintaining process according to one or more embodiments. Referring to FIG. 11, the default device maintaining process according to one or more embodiments is different from the process shown in FIG. 6 in that the step S09 is changed to the step S31, the step S32 and the step S33, and the step S11 is changed to the step S34. The rest of the process is the same as the process shown in FIG. 6. A description therefore will not be repeated.

The CPU 201 acquires the device identification information of the default device in the step S31, and the process proceeds to the step S32. In the step S32, the CPU 201 determines whether the control target device of the target driver is a device different from the default device specified by the device identification information acquired in the step S21. In the case where the control target device of the target driver is a device different from the default device, the process proceeds to the step S33. If not, the process proceeds to the step S12.

In the step S33, the port correspondence information is changed, and the process proceeds to the step S10. Specifically, the CPU 201 changes the device identification information corresponding to the output port assigned to the control target device of the target driver from the device identification information of the control target device of the target driver to the device identification information of the default device acquired in the step S31 in the port correspondence information. In this case, the OS task determines based on the port correspondence information changed in the step S33 that the default device is set as the execution device. Therefore, the OS task determines that the default device and the execution device are the same device, and does not change the default device. In the step S34, the CPU 201 changes back the port correspondence information to the previous state before the port correspondence information is changed in the step S33, and the process ends.

As described above, in the case where the default device specified by the acquired device identification information is different from the control target device, the PC 200 according to one or more embodiments allows the OS task to acquire the device identification information of the default device instead of the device identification information of the control target device in response to reception of an instruction for printing by the control target device given by the application task. Thus, even in the case where printing is performed by the execution device that is a device different from the default device, the OS task acquires the device identification information of the default device, so that the default device is not changed. Thus, the OS task is prevented from changing the default device against intension of the user. Therefore, the user is prevented from involving in extra labor and degradation of convenience for the user is prevented.

Further, in the case where the default device specified by the acquired device identification information is different from the control target device, before printing is performed by the control target device, the PC 200 rewrites the device identification information associated with the output port assigned to the control target device by the port correspondence information with the device identification information of the default device. Thus, the OS task can be easily prevented from changing the default device against intension of the user.

Further, after printing is performed by the control target device, the PC 200 rewrites the device identification information associated with the output port assigned to the control target device by the port correspondence information with the device identification information of the control target device. Thus, the port correspondence information is prevented from being maintained changed. Therefore, in the case where the user does not wish to maintain the default device, it is possible to set the execution device as the default device using the function of the OS task by disabling the default device maintaining function.

Figure 12:
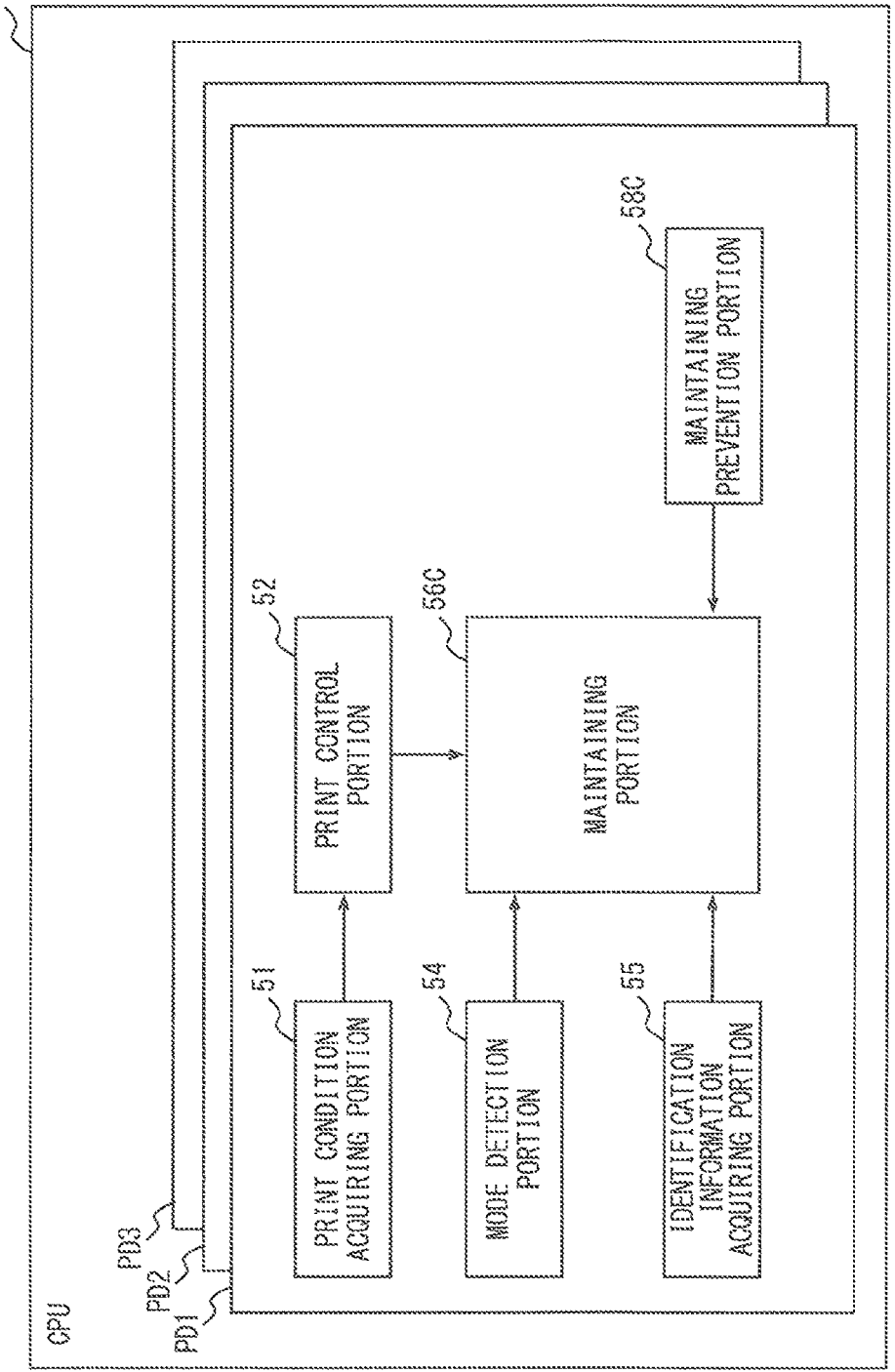
FIG. 12 is a block diagram showing an example of functions of a CPU included in a PC in a modified example of the embodiments.

FIG. 12 is a block diagram showing an example of functions of a CPU 201 included in a PC 200 in the modified example of the above-mentioned embodiments. Referring to FIG. 12, the functions of the CPU 201 in the modified example are different from the functions shown in FIG. 10 in that the functions of the OS task are changed, the maintaining portion 56B is changed to a maintaining portion 56C, and the maintaining prevention portion 58B is changed to a maintaining prevention portion 58C.

Before the print control portion 52 allows the control target device to perform printing, the maintaining portion 56C receives instruction acceptance information from the print control portion 52, receives an OS mode from the mode detection portion 54 and receives device identification information of the default device from the identification information acquiring portion 55. In the case where the received OS mode is the maintaining mode, or the case where the default device specified by the received device identification information and the control target device are the same device, the maintaining portion 56C outputs the device identification information of the control target device to the OS task. On the other hand, in the case where the received OS mode is the changing mode, and the default device specified by the received device identification information is a device different from the control target device, the maintaining portion 56C outputs the device identification information of the default device instead of the device identification information of the control target device to the OS task. The maintaining portion 56C may output the device identification information before the print control portion 52 outputs the print instruction information, may output the device identification information at the same time as the print control portion 52 outputs the print instruction information or may output the device identification information after the print control portion 52 outputs the print instruction information.

The OS task determines that a device, specified by the device identification information output by the maintaining portion 56C, among the MFPs 100, 100A, 100B is the execution device. In the case where the OS mode is the changing mode, and the control target device is a device different from the default device, the device identification information of the default device is output from the maintaining portion 56C. Thus, the OS task determines that not the MFP that has actually performed printing default device but the default device is the execution device. Therefore, the OS task determines that the default device and the execution device are the same device, and does not change the default device. Thus, the same MFP is maintained as the default device before and after printing is performed by the control target device.

The maintaining prevention portion 58C can prevent the maintaining portion 56C from maintaining of the default device. Specifically, in the case where disabling of the default device maintaining function is selected, even when the OS mode is the changing mode, and the control target device is a device different from the execution device, the maintaining prevention portion 58C allows the maintaining portion 56C to output the device identification information of the control target device. In this case, the OS task determines which device among the MFPs 100, 100A, 100B is the execution device that has actually performed printing based on the device identification information that is output from the maintaining portion 56C. Therefore, in the case where the OS mode is the changing mode, and the default device is a device different from the execution device, the execution device is set as the default device.

Figure 13:
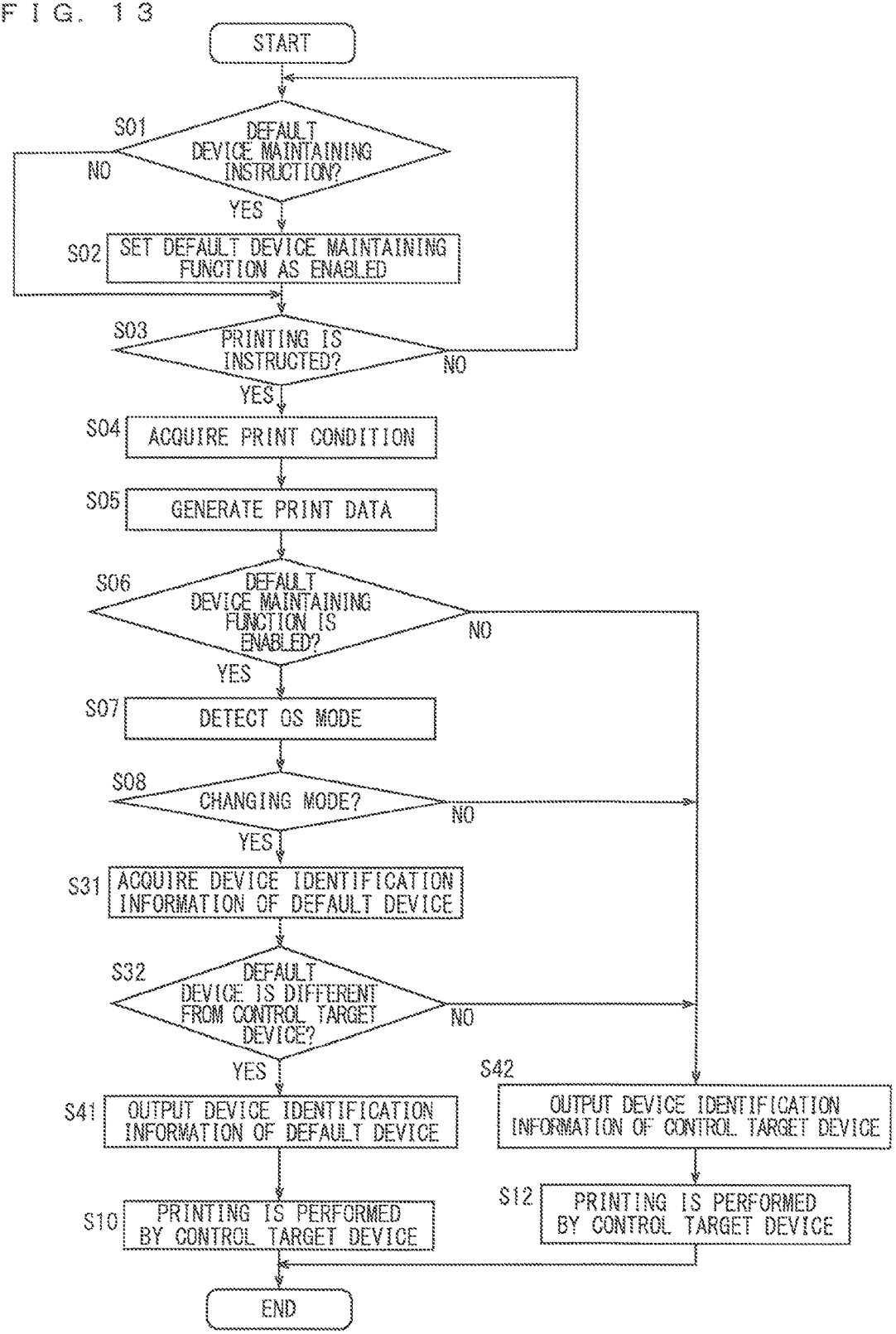
FIG. 13 is a flow chart showing an example of a flow of a default device maintaining process in the modified example of the embodiments.

FIG. 13 is a flow chart showing an example of a flow of the default device maintaining process in the modified example of the above-mentioned embodiments. Referring to FIG. 13, the default device maintaining process in the modified example is different from the process shown in FIG. 11 in that the step S33 is changed to the step S41, the step S53 is added as a process that comes right before the step S12, and the step S34 is removed. The rest of the process is the same as the process shown in FIG. 11. A description therefore will not be repeated.

In the step S41, the CPU 201 outputs the device identification information of the default device acquired in the step S21, and the process proceeds to the step S10. In this case, the OS task determines that the default device is the execution device based on the device identification information output in the step S41. Therefore, the OS task determines that the default device and the execution device are the same device, and does not change the default device.

In the case where the answer is "NO" in the step S06, the step S08 and the step S32, the process proceeds to the step S42. The device identification information of the control target device of the target driver is output in the step S42, and the process proceeds to the step S12.

In this manner, in the case where the default device is a device different from the control target device, the PC 200 in the modified example of the above-mentioned embodiments outputs the device identification information of the default device instead of the device identification information of the control target device to the OS task. Thus, the OS task can be easily prevented from changing the default device against intension of the user.

As the functions of the CPU 201 included in the PC 200, the target application acceptance portion 61 and the target condition acceptance portion 62 shown in FIG. 7 may be added to the functions shown in FIG. 10 or 12, and the print control portion 52 may be changed to the print control portion 52A shown in FIG. 7. In this case, the application program and the print condition that are the targets of the default device maintaining function are set as the target application and the target condition. In the case where printing is instructed by the application task that executes the target application, the maintaining portions 56B. 56C maintain the same MFP as the default device before and after printing is performed by the control target device. Further, in the case where the print condition includes the target condition, the maintaining portions 56B, 56C maintain the same MFP as the default device before and after printing is performed by the control target device. Thus, it is possible to change whether the default device is changed by the OS task depending on the application program and the print condition. Therefore, only in the case where printing is executed under a condition desired by the user, the same device can be maintained as the default device before and after printing.

Figure 14:
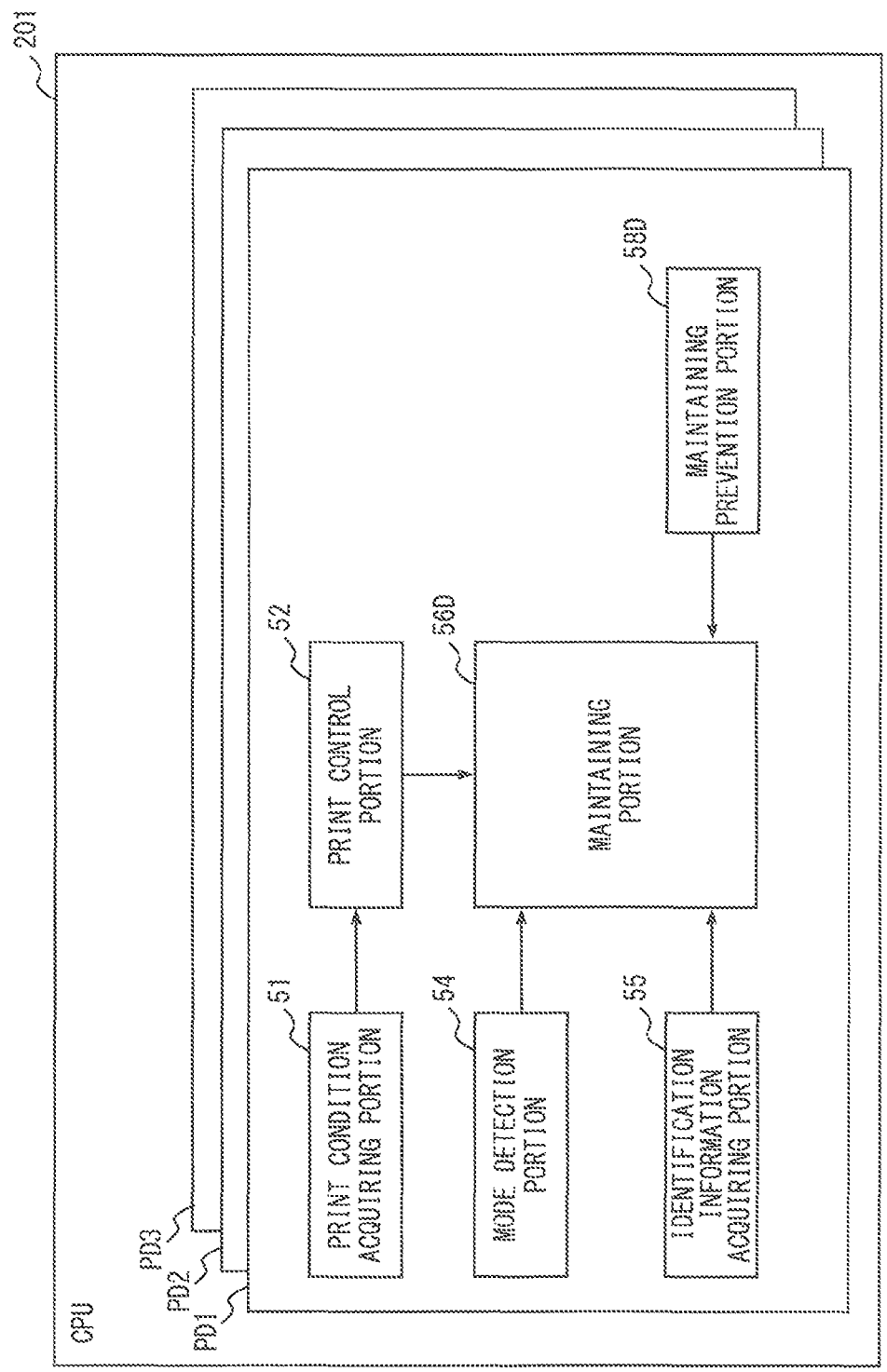
FIG. 14 is a block diagram showing an example of functions of a CPU included in a PC according to one or more embodiments.

FIG. 14 is a block diagram showing an example of functions of a CPU 201 included in a PC 200 according to one or more embodiments. Referring to FIG. 14, the functions of the CPU 201 according to one or more embodiments are different from the functions shown in FIG. 5 in that the maintaining portion 56 is changed to a maintaining portion 56D, and the maintaining prevention portion 58 is changed to a maintaining prevention portion 58D.

Before the print control portion 52 allows the control target device to perform printing, the maintaining portion 56D receives the OS mode from the mode detection portion 54, and receives the device identification information of the default device from the identification information acquiring portion 55. Further, after the print control portion 52 allows the control target device to perform printing, the maintaining portion 56D receives the print completion information from the print control portion 52. In the case where the received OS mode is the changing mode, and the default device specified by the received device identification information is a device different from the control target device, after printing is performed by the control target device, the maintaining portion 56D sets a device specified by the device identification information received from the identification information acquiring portion 55 as the default device.

For example, in the case where the received OS mode is the changing mode, and the default device specified by the device identification information received from the identification information acquiring portion 55 is different from the control target device, in response to reception of the print completion information, the maintaining portion 56D rewrites the default device stored in the default device storage region of the RAM 203 or the HDD 204 with the device specified by the device identification information received from the identification information acquiring portion 55.

In response to an event that the print control portion 52 allows the control target device to perform printing, the OS task sets the control target device as the default device. The device identification information that is input in the maintaining portion 56D by the identification information acquiring portion 55 is the device identification information of the default device before the change. Therefore, after the control target device performs printing, the device specified by the device identification information input in the maintaining portion 56D is set as the default device. Thus, the default device is changed back to the device before the change. Thus, the same MFP is maintained as the default device before and after printing is performed by the control target device.

The maintaining prevention portion 58D can prevent the maintaining portion 56D from maintaining the default device. Specifically, in the case where disabling of the default device maintaining function is selected, the maintaining prevention portion 58D prevents the maintaining portion 56D from changing the default device. In this case, the OS task determines which device among the MFPs 100, 100A, 100B has actually performed printing with reference to the port correspondence information. Therefore, in the case where the OS mode is the changing mode, and the default device is a device different from the execution device, the execution device is set as the default device.

Figure 15:
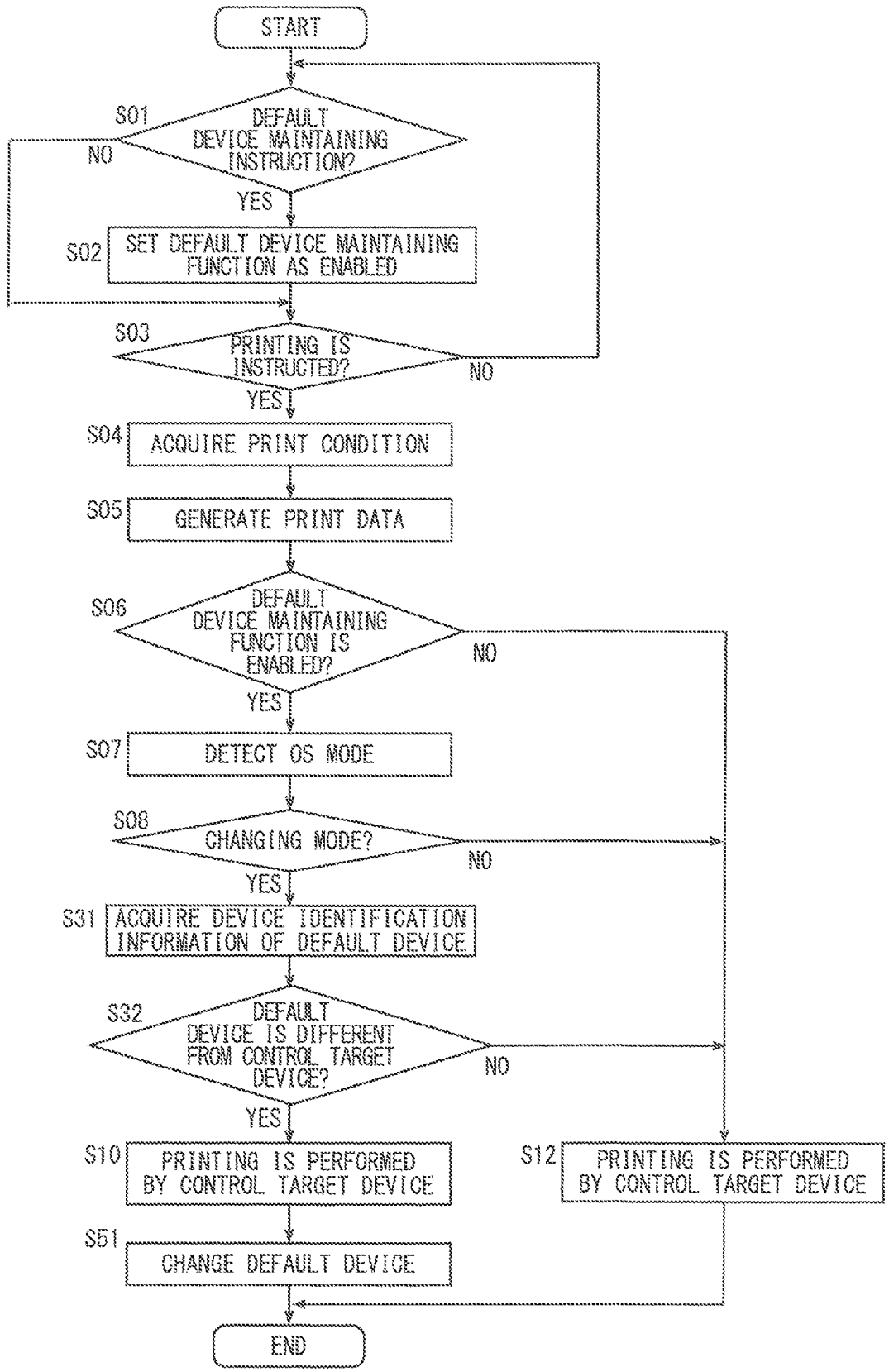
FIG. 15 is a flow chart showing an example of a flow of a default device maintaining process in one or more embodiments.

FIG. 15 is a flow chart showing an example of a flow of the default device maintaining process in one or more embodiments. Referring to FIG. 15, the default device maintaining process in one or more embodiments is different from the process shown in FIG. 11 in that the step S33 is removed, and the step S34 is changed to the step S51. The rest of the process is the same as the process shown in FIG. 11. A description therefore will not be repeated.

In response to an event that the CPU 201 allows the control target device of the target driver to perform printing in the step S10, the OS task sets the control target device of the target driver as the default device. In the step S51, the CPU 201 changes the default device after the change by the OS task to the device specified by the device identification information acquired in the step S31, and the process ends. Thus, the default device is changed back to the device before the change.

As described above, in the case where the device identification information acquired before printing is different from the device identification information of the control target device, after printing is performed by the control target device, the PC 200 in one or more embodiments sets the device specified by the device identification information acquired before printing as the default device. Thus, after the OS task sets the control target device as the default device, the default device is changed back to the device before the change. Therefore, the same image forming apparatus can be maintained as the default device before and after printing. Thus, the user is prevented from involving in extra labor, and degradation of convenience for the user is prevented.

As the functions of the CPU 201 included in the PC 200, the target application acceptance portion 61 and the target condition acceptance portion 62 shown in FIG. 7 may be added to the functions shown in FIG. 14, and the print control portion 52 may be changed to the print control portion 52A shown in FIG. 7. In this case, the application program and the print condition that are targets of the default device maintaining function are set as the target application and the target condition. In the case where being instructed to perform printing by the application task that executes the target application, the maintaining portion 56D maintains the same MFP as the default device before and after printing is performed by the control target device. In the case where the print condition includes the target condition, the same MFP is maintained as the default device before and after printing is performed by the control target device. Thus, whether the default device is changed by the OS task can be changed depending on the application program and the print condition. Therefore, only in the case where printing is performed under a condition desired by the user, the same device can be maintained as the default device before and after printing.

While the MFP has been explained as an example of the image forming apparatus in the above-mentioned embodiments, it may be a printer or a facsimile machine.

While an example in which the target condition is set by the user according to some embodiments of the present invention, the target condition may be a print condition that corresponds to a function included in the control target device and not included in other MFPs among the plurality of MFPs. For example, in the printer driver PD2, a print condition that corresponds to a function included in the MFP 100A, which is the control target device, and not included in the other MFPs 100, 100B is the target condition.

Further, the PC 200, which is an example of the control device, has been described in the above-mentioned embodiments. However, it is needless to say that one or more embodiments of the present invention can be specified as a control method for allowing the PC 200 to execute the processes shown in FIGS. 6, 9, 11, 13 and 15, and also as the printer driver program for allowing the CPU 201 included in the PC 200 to perform the control method.

In an information processing apparatus according to one or more embodiments, the target condition includes a print condition that corresponds to a function included in the control target device among the plurality of image forming apparatuses and not included in the other one or more image forming apparatuses among the plurality of image forming apparatuses.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A control device that executes an operating system program, comprising:
a hardware processor, wherein the operating system program defines:
a process of setting an image forming apparatus among a plurality of image forming apparatuses as a default device; and
a changing process of, in a case where an execution device different from the default device is designated among the plurality of image forming apparatuses by an application task for executing an application program and printing is executed by the execution device, changing the default device to the execution device, and
the hardware processor:
in response to an instruction to execute printing given by the application task, allows a control target device among the plurality of image forming apparatuses to execute the printing;
maintains the same image forming apparatus as the default device before and after the printing is executed by the control target device;
accepts setting of a selection of whether the default device is maintained or changed; and
maintains or changes the default device based on types of the printing, wherein
the changing process defined by the operating system program includes:
an acquiring process of, in the case where an execution device is designated from among the image forming apparatuses by the application task, acquiring device identification information for identifying the execution device; and
a process of, in the case where the execution device specified by the acquired device identification information is different from the default device, changing the default device to the execution device, and
the hardware processor:
acquires device identification information of the default device before allowing the control target device to execute printing; and in the case where the default device specified by the acquired device identification information is different from the control target device, in response to an instruction for printing by the control target device given by the application task, allows a task for executing the operating system program to acquire the device identification information of the default device instead of device identification information of the control target device in the acquiring process defined by the operating system program.

2. The control device according to claim 1, wherein
the operating system program defines a process of setting one of a changing mode and a maintaining mode as a mode, and
the changing process, in the case where the execution device different from the default device is designated among the image forming apparatuses by the application task and printing is executed, defines a process of changing the default device to the execution device in the changing mode, and a process of not changing the default device to the execution device in the maintaining mode, and
the hardware processor:
detects the mode; and
in the case where the detected mode is the changing mode, changes the mode from the changing mode to the maintaining mode before the control target device is allowed to execute printing.

3. The control device according to claim 2, wherein
the hardware processor, after printing is executed by the control target device, changes the mode that has been changed to the maintaining mode to the changing mode.

4. The control device according to claim 1, wherein
the acquiring process defined by the operating system program includes a process of, with reference to port correspondence information that associates respective pieces of device identification information of the image forming apparatuses with respective output ports assigned to the image forming apparatuses, acquiring device identification information associated with an output port from which data is output among the output ports that are respectively associated with the image forming apparatuses as device identification information of the execution device, and
the hardware processor, in the case where a default device specified by the acquired device identification information is different from the control target device, rewrites device identification information associated with an output port assigned to the control target device by the port correspondence information with device identification information of the default device before printing is executed by the control target device.

5. The control device according to claim 4, wherein
the hardware processor, after printing is executed by the control target device, rewrites the device identification information associated with the output port assigned to the control target device by the port correspondence information with device identification information of the control target device.

6. The control device according to claim 1, wherein
the hardware processor, in the case where the default device specified by the acquired device identification information is different from the control target device, outputs the device identification information of the default device instead of the device identification information of the control target device to the task for executing the operating system program.

7. The control device according to claim 1, wherein the hardware processor, in the case where the acquired device identification information is different from device identification information of the control target device, changes the default device to a device specified by the acquired device identification information after printing is executed by the control target device.

8. The control device according to claim 1, wherein a plurality of types of application programs are executed by a plurality of application tasks, and
the hardware processor:
    accepts setting of a target application program among the types of application programs; and
    in the case where printing is instructed by the application task that executes the target application program, maintains the same image forming apparatus as the default device before and after printing is executed by the control target device.

9. The control device according to claim 1, wherein the hardware processor:
    acquires a print condition;
    accepts setting of a target condition among selectable print conditions; and
    in the case where the acquired print condition includes the set target condition, maintains the same image forming apparatus as the default device before and after printing is executed by the control target device.

10. A control method executed in a control device that executes an operating system program, wherein
the operating system program defines:
    a process of setting an image forming apparatus among a plurality of image forming apparatuses as a default device; and
    a changing process of, in the case where an execution device different from the default device is designated among the plurality of image forming apparatuses by an application task for executing an application program and printing is executed by the execution device, changing the default device to the execution device, and
the control method includes:
    a print control step of, in response to an instruction for printing given by the application task, allowing a control target device among the plurality of image forming apparatuses to execute the printing;
    a maintaining step of maintaining the same image forming apparatus as the default device before and after the printing is executed by the control target device;
    an accepting step of accepting setting of a selection of whether the default device is maintained or changed; and
    maintaining or changing the default device based on types of the printing, wherein
the changing process defined by the operating system program includes:
    an acquiring process of, in the case where an execution device is designated from among the image forming apparatuses by the application task, acquiring device identification information for identifying the execution device; and
    a process of, in the case where the execution device specified by the acquired device identification information is different from the default device, changing the default device to the execution device,
the control method further includes:
    an identification information acquiring step of acquiring device identification information of the default device before the control target device is allowed to execute printing in the print control step; and
    the maintaining step includes a step of, in the case where the default device specified by the acquired device identification information is different from the control target device, in response to an instruction for printing by the control target device given by the application task, allowing a task for executing the operating system program to acquire the device identification information of the default device instead of device identification information of the control target device in the acquiring process defined by the operating system program.

11. The control method according to claim 10, wherein the operating system program defines a process of setting one of a changing mode and a maintaining mode as a mode, and
the changing process, in the case where the execution device different from the default device is designated among the image forming apparatuses by the application task and printing is executed, defines a process of changing the default device to the execution device in the changing mode, and a process of not changing the default device to the execution device in the maintaining mode, and
the control method further includes a mode detection step of detecting the mode, and
the maintaining step includes a step of, in the case where the detected mode is the changing mode, changing the mode from the changing mode to the maintaining mode before the control target device is allowed to execute printing in the print control step.

12. The control method according to claim 11, further including a restoring step of, after printing is executed by the control target device, changing the mode that has been changed to the maintaining mode in the maintaining step to the changing mode.

13. The control method according to claim 10, wherein the acquiring process defined by the operating system program includes:
    a process of, with reference to port correspondence information that associates respective pieces of device identification information of the image forming apparatuses with respective output ports assigned to the image forming apparatuses, acquiring device identification information associated with an output port from which data is output among the output ports that are respectively associated with the image forming apparatuses as device identification information of the execution device; and
    the maintaining step includes a step of, in the case where a default device specified by the acquired device identification information is different from the control target device, rewriting device identification information associated with an output port assigned to the control target device by the port correspondence information with device identification information of the default device before printing is executed by the control target device.

14. A non-transitory computer-readable recording medium storing a printer driver program, wherein
the printer driver program is executed in a hardware processor included in a control device that executes an operating system program, the operating system program defines:
a process of setting an image forming apparatus among a plurality of image forming apparatuses as a default device; and
a changing process of, in the case where an execution device different from the default device is designated among the plurality of image forming apparatuses by an application task for executing an application program and printing is executed by the execution device, changing the default device to the execution device, and the printer driver program allows the hardware processor to execute:
a print control step of, in response to an instruction for printing given by the application task, allowing a control target device among the plurality of image forming apparatuses to execute the printing;
a maintaining step of maintaining the same image forming apparatus as the default device before and after the printing is executed by the control target device;
an accepting step of accepting setting of a selection of whether the default device is maintained or changed; and
maintaining or changing the default device based on types of the printing, wherein the changing process defined by the operating system program includes:
an acquiring process of, in the case where an execution device is designated from among the image forming apparatuses by the application task, acquiring device identification information for identifying the execution device; and
a process of, in the case where the execution device specified by the acquired device identification information is different from the default device, changing the default device to the execution device, the printer driver program allows the hardware processor to execute an identification information acquiring step of acquiring device identification information of the default device before the control target device is allowed to execute printing in the print control step, and
the maintaining step includes a step of, in the case where a default device specified by the acquired device identification information is different from the control target device, in response to an instruction for printing by the control target device given by the application task, allowing a task for executing the operating system program to acquire device identification information of the default device instead of device identification information of the control target device in the acquiring process defined by the operating system program.

15. The non-transitory computer-readable recording medium storing the printer driver program according to claim 14, wherein
the operating system program defines a process of setting one of a changing mode and a maintaining mode as a mode, and
the changing process, in the case where the execution device different from the default device is designated among the image forming apparatuses by the application task and printing is executed, defines a process of changing the default device to the execution device in the changing mode, and a process of not changing the default device to the execution device in the maintaining mode, and
the printer driver program allows the hardware processor to execute:
a mode detection step of detecting the mode; and
the maintaining step includes a step of, in the case where the detected mode is the changing mode, changing the mode from the changing mode to the maintaining mode before the control target device is allowed to execute printing in the print control step.

16. The non-transitory computer-readable recording medium storing the printer driver program according to claim 15, wherein
the printer driver program allows the hardware processor to execute a restoring step of, after printing is executed by the control target device, changing the mode that has been changed to the maintaining mode in the maintaining step to the changing mode.

17. The non-transitory computer-readable recording medium storing the printer driver program according to claim 14, wherein
the acquiring process defined by the operating system program includes a process of, with reference to port correspondence information that associates respective pieces of device identification information of the image forming apparatuses with respective output ports assigned to the image forming apparatuses, acquiring device identification information associated with an output port from which data is output among the output ports that are respectively associated with the image forming apparatuses as device identification information of the execution device, and
the maintaining step includes a step of, in the case where a default device specified by the acquired device identification information is different from the control target device, rewriting device identification information associated with an output port assigned to the control target device by the port correspondence information with device identification information of the default device before printing is executed by the control target device.

* * * * *